US010406725B2

(12) United States Patent
Takahashi et al.

(10) Patent No.: US 10,406,725 B2
(45) Date of Patent: Sep. 10, 2019

(54) LIGHT SOURCE APPARATUS FOR RESIN CURING

(71) Applicants: HOLONIX INTERNATIONAL CO., LTD., Yokohama-shi, Kanagawa (JP); YAMASHITA DENSO CORPORATION, Hachioji-shi, Tokyo (JP)

(72) Inventors: Kuniaki Takahashi, Yokohama (JP); Nobuhiko Kubo, Hachioji (JP)

(73) Assignees: HOLONIX INTERNATIONAL CO., LTD., Yokohama-shi (JP); YAMASHITA DENSO CORPORATION, Hachioji-shi (JP)

( * ) Notice: Subject to any disclaimer, the term of this patent is extended or adjusted under 35 U.S.C. 154(b) by 0 days.

(21) Appl. No.: 16/099,378

(22) PCT Filed: Aug. 15, 2016

(86) PCT No.: PCT/JP2016/073819
§ 371 (c)(1),
(2) Date: Nov. 6, 2018

(87) PCT Pub. No.: WO2017/203727
PCT Pub. Date: Nov. 30, 2017

(65) Prior Publication Data
US 2019/0202091 A1    Jul. 4, 2019

(30) Foreign Application Priority Data
May 26, 2016 (JP) .................................. 2016-104868

(51) Int. Cl.
*B29C 35/08* (2006.01)
*G02B 26/02* (2006.01)

(52) U.S. Cl.
CPC .............. *B29C 35/08* (2013.01); *G02B 26/02* (2013.01)

(58) Field of Classification Search
CPC ................................. B29C 35/08; G02B 26/02
(Continued)

(56) References Cited

U.S. PATENT DOCUMENTS 4,563,589 A * 1/1986 Scheffer .................. B29C 35/08
250/504 R
5,932,886 A * 8/1999 Arai ....................... B01J 19/123
250/504 R

FOREIGN PATENT DOCUMENTS

JP    5-104543 A    4/1993
JP    5-253526 A    10/1993
(Continued)

OTHER PUBLICATIONS

International Search Report dated Sep. 6, 2016, issued in counterpart International Application No. PCT/JP2016/073819 (1 page).

Primary Examiner — Michael Maskell
(74) Attorney, Agent, or Firm — Westerman, Hattori, Daniels & Adrian, LLP

(57) ABSTRACT

Provided is a light source apparatus for resin curing capable of hardening even conventional UV curing resin by irradiating ray in a short time without producing any tackiness on the resin surface, and capable of irradiating a ray for efficiently hardening not only a UV curing resin but also an IR curing resin. The light source apparatus includes a light source, an optical system for guiding a light emitted from the light source to an emission section, and a light transmission section, selectively insertable in a light path in the optical system, for passing there through a UV-C ultraviolet ray containing a ray in the wavelength range of 250 nm, a visible light except for light in the wavelength range from 500 nm (Continued)

to 640 nm and an infrared ray together so as to remove a tackiness on a resin surface.

9 Claims, 19 Drawing Sheets

(58) Field of Classification Search
USPC .......................... 250/504 R, 453.11–455.11
See application file for complete search history.

(56) References Cited

FOREIGN PATENT DOCUMENTS

| | | |
|---|---|---|
| JP | 11-128800 A | 5/1999 |
| JP | 2006-176653 A | 7/2006 |
| JP | 2016-90625 A | 5/2016 |

\* cited by examiner

LIGHT SOURCE APPARATUS FOR RESIN CURING

FIELD OF THE INVENTION

The present invention relates to a light source apparatus for resin curing used to harden a photocurable resin such as a resin adhesive.

BACKGROUND ART

An adhesive coating apparatus or an adhesive curing apparatus for curing an adhesive coated by irradiating ultraviolet ray is known and widely used in the fields of fabricating electronic parts and medical care parts (for example, Patent Documents 1-3).

These conventional adhesive coating apparatus and adhesive curing apparatus irradiate an ultraviolet (UV) ray to a UV cure adhesive with a UV ray so as to harden (cure) the adhesive. A UV spot curing device provided by the applicant of this application from several decades ago, for example, is configured to rapidly harden a very small area on which a UV cure adhesive fabricated to absorb a ray in a wavelength mainly on 365 nm most efficiently is coated with an infinitesimal quantity. This UV spot curing device irradiates a spot light by cutting the light energy in a visible light region and an infrared (IR) ray region to use UV ray in the wavelength mainly on 365 nm effectively.

RELATED ART DOCUMENT

Patent Document

Patent Document 1: Japanese Patent Publication No. H05-253526A
Patent Document 2: Japanese Patent Publication No. H11-128800A
Patent Document 3: Japanese Patent Publication No. 2006-176653A

SUMMARY OF THE INVENTION

Problem to be Solved by the Invention

It had been found that when the ultraviolet ray was irradiated to the UV curing resin by cutting the unnecessary light energy, although the surface of the resin was appeared to stiffen, inner curing situation of the resin was unidentified and also slime or stickiness (tackiness) was remained on the resin surface. Therefore, conventionally, after the curing process of the ultraviolet ray irradiation, the object was heated at a high temperature in an oven.

However, according to this conventional method, due to the additional time for heating the object in the oven, the overall processing time became longer and, in case of a medical care object in particular, impurities might be attached to the surface of the object on which the tackiness was still remained during transferring of the object to the oven causing that the object might become a defective article.

Generally, in a curing process of the UV curing resin, it is considered that an ultraviolet ray with the shortest wavelength range (UV-C ultraviolet ray in the wavelength from 200 nm to less than 280 nm) acts for hardening the surface zone of the resin, that an ultraviolet ray in the wavelength range longer than the above range (UV-B ultraviolet ray in the wavelength from 280 nm to less than 315 nm) acts for hardening the middle depth zone of the resin, and that an ultraviolet ray in the wavelength range longer than the above range (UV-A ultraviolet ray in the wavelength from 315 nm to 400 nm), a visible light and an infrared ray act for hardening the deeper zone of the resin, namely the zone nearest to the object. However, if the ray with all the wavelengths is irradiated at the same time, although the tackiness on the resin surface can be eliminated, many inexpediences such as destruction (deformation) in the UV curing resin, damage and/or burn were occurred due to too strong energy. Therefore, in the conventional curing process, in the most cases, the UV curing resin on the object was hardened by irradiating the UV-B ultraviolet ray and the ray in the wavelength longer than the UV-B ultraviolet ray thereto, and then, after the UV curing resin was completely stiffened, possible tackiness remained on the surface of the object was removed by taking time using a high temperature oven.

Other than the problem of occurring of pollution on the resin surface of the object, it should be considered about heat resistance of the object against the heat-treatment. Many of objects such as electronic parts or liquid crystals might have low resistance against the applied high temperature. Thus, the temperature of the heat treatment for removing the tackiness had to lower, but this lowering caused the increase in the processing time. Under these circumstances, it was necessary to develop a new resin material that never invites such problems of the tackiness removal, or to apply very high temperature in a quite short time for removing the tackiness on the resin surface after the UV curing.

It is therefore an object of the present invention to provide a light source apparatus for resin curing, whereby even conventional UV curing resin can be hardened by irradiating ray in a short time without producing any tackiness on the resin surface.

Another object of the present invention is to provide a light source apparatus for resin curing, whereby a ray capable of efficiently hardening not only a UV curing resin but also an IR curing resin can be irradiated.

Means to Solve the Problem

According to the present invention, a light source apparatus for resin curing includes a light source, an optical system for guiding a light emitted from the light source to an emission section, and a light transmission section, selectively insertable in a light path in the optical system, for passing there through a UV-C ultraviolet ray containing a ray in the wavelength range of 250 nm, a visible light except, for light in the wavelength range from 500 nm to 640 nm and an infrared ray together so as to remove a tackiness on a resin surface.

By irradiating a UV-C ultraviolet ray containing a ray in the wavelength range of 250 nm, a visible light except for light in the wavelength range from 500 nm to 640 nm and an infrared ray together to a UV curing resin, it is possible to harden the UV curing resin in a short time without producing tackiness (slime or stickiness) on the resin surface. Also, it is possible to efficiently harden not only the UV curing resin but also an IR curing resin.

It is preferred that the light transmission section is configured to further pass a UV-B ultraviolet ray and a UV-A ultraviolet ray.

It is also preferred that the light transmission section includes a transmission filter or a transmission mirror for passing an ultraviolet ray with the above-mentioned wavelength range, a visible light with the above-mentioned wavelength range and an infrared ray.

It is further preferred that the apparatus is configured that a low band-reject filter, provided with light transmission characteristics capable of attenuating a part of the wavelength of a UV-C ultraviolet ray, is selectively insertable in a part of or entire of a light focusing region of the light path. Thus an energy amount of ray in the tackiness removal wavelength (ultraviolet, ray near 254 nm) can be controlled depending on the inserted amount of the low band-reject filter so that a ratio of relative intensities between the ray in the UV curing dominant wavelength (ultraviolet ray near 365 nm) and the ray in the tackiness removal wavelength can be freely adjusted. As a result, tackiness removal of the UV curing resin can be performed under optimum conditions.

It is still further preferred that the apparatus is configured that an energy adjustment optical element for adjusting energy of ray in the wavelength range around 365 nm that is a UV curing dominant wavelength of a UV-C ultraviolet ray is insertable in a light focusing region of the light path. By inserting the energy adjustment optical element, an energy amount of the ray in the UV curing dominant wavelength can be controlled so that a ratio of relative intensities between the ray in the UV curing dominant wavelength and the ray in the tackiness removal wavelength can be freely adjusted. As a result, tackiness removal of the UV curing resin can be performed under optimum conditions.

In this case, it is more preferred that the energy adjustment optical element is configured to adjust transmission energy of ray in the wavelength range around 365 nm by changing an incident angle of a multilayer film type interference filter.

It is further preferred that the apparatus further includes a shutter mechanism inserted in the light path of the optical system for opening and closing the light path so as to control an exposure time of an object to be irradiated, and that the shutter mechanism is configured so that the above-mentioned light transmission section can be selectively inserted in the light path.

It is further preferred that the light source includes a metal halide lamp, mercury-xenon lamp or a plurality of LED elements.

It is further preferred that the optical system includes an ellipse mirror for reflecting and focusing a ray in all wavelength bands emitted from the light source, or a lens for focusing a ray in all wavelength bands emitted from the light source.

Effect of the Invention

According to the present invention, it is possible to harden the UV curing resin in a short time without remaining any tackiness on the resin surface. Also, it is possible to efficiently harden not only the UV curing resin but also the IR curing resin.

BEST MODE FOR CARRYING OUT THE INVENTION

Figure 1:
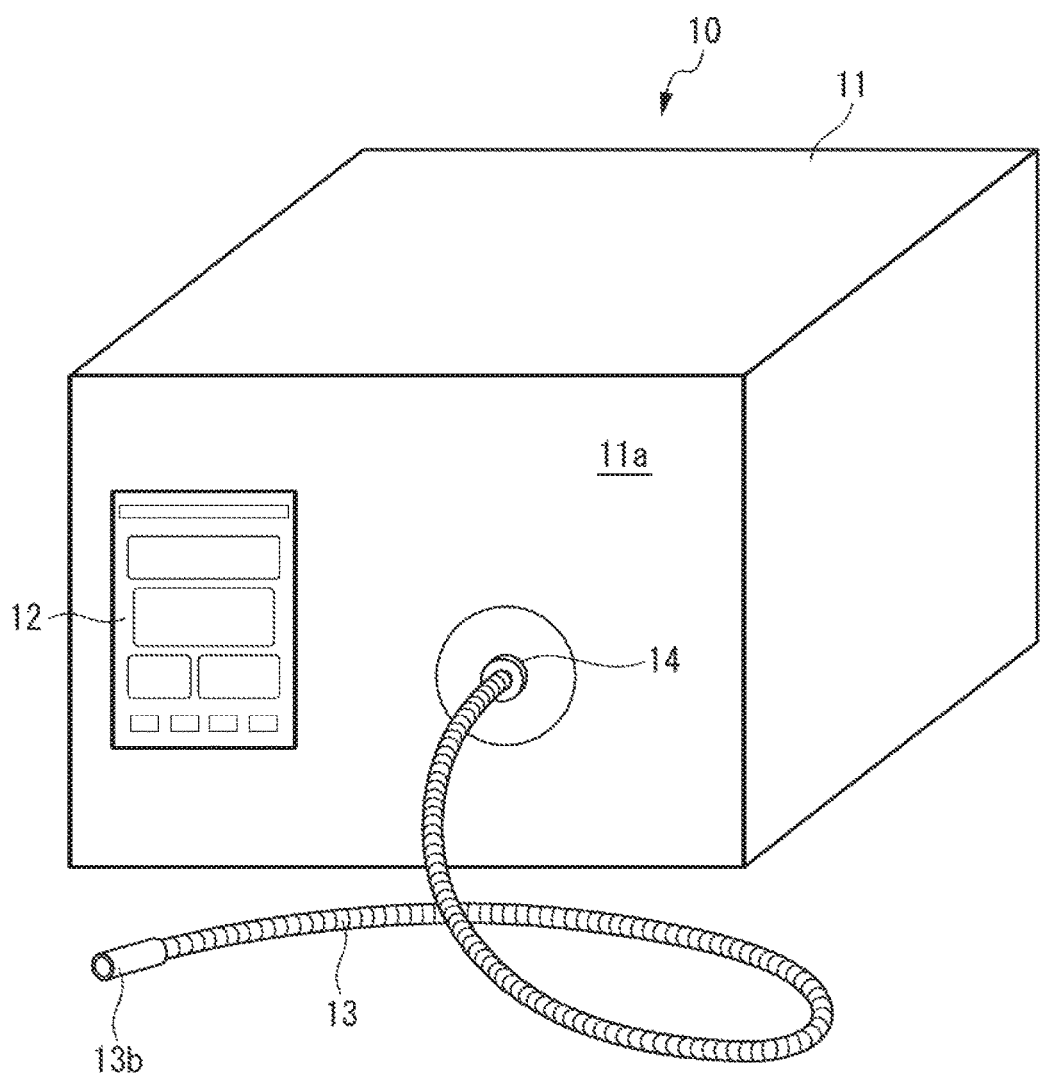
FIG. 1 is a perspective view schematically illustrating appearance configuration of a light source apparatus for resin curing in an embodiment according to the present invention.

FIG. 1 schematically illustrates appearance configuration of a light source apparatus for resin curing in an embodiment according to the present invention.

As shown in the figure, on a front surface 11a of a housing 11 that accommodates a light source apparatus for resin curing 10 is provided with a control panel 12 constituted by touch panel-type displays, and an attachment 14 of an optical fiber bundle 13 that leads a light spot to an object to be irradiated.

Figure 2:
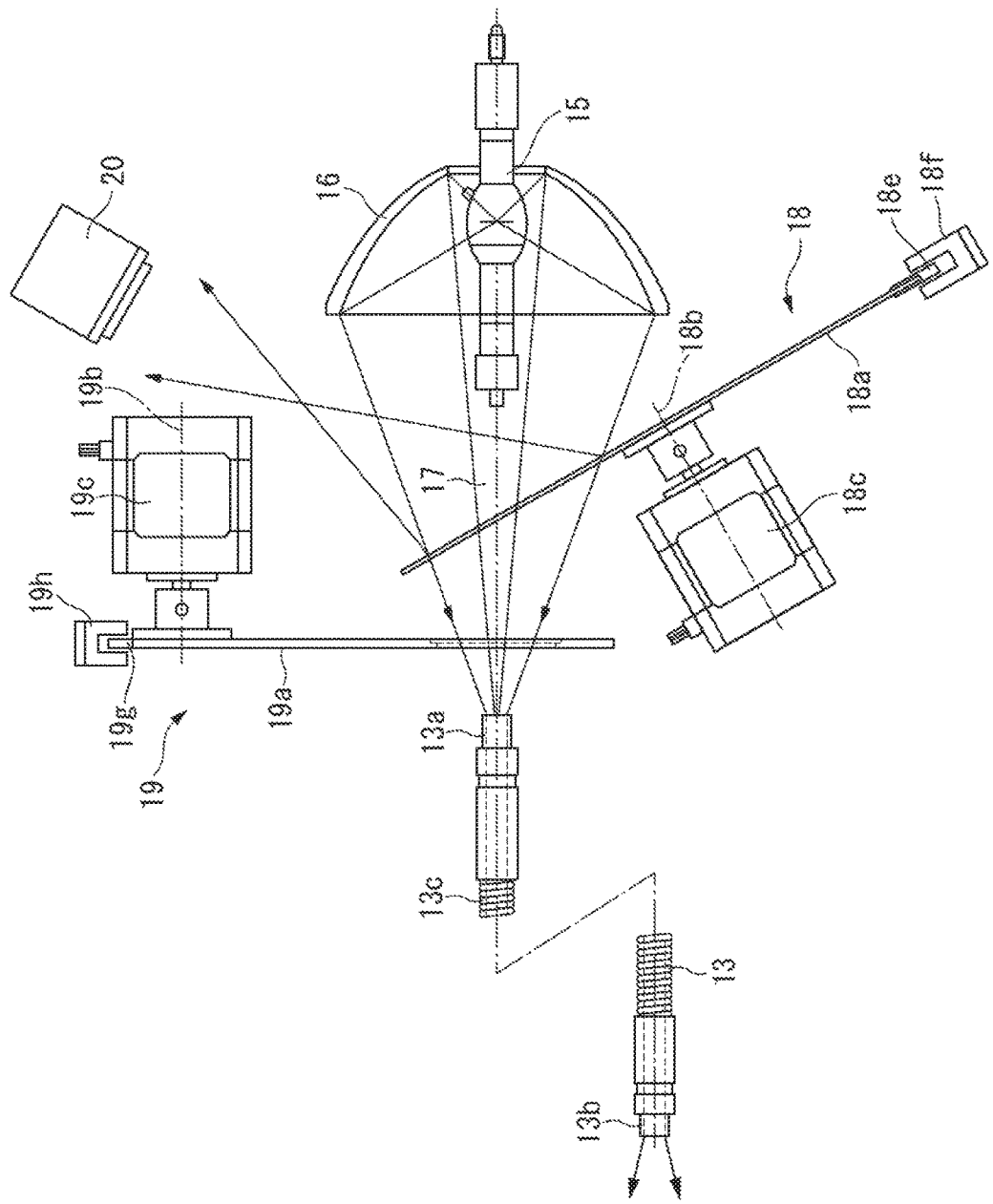
FIG. 2 is a plane view schematically illustrating optical configuration of the light source apparatus for resin curing in the embodiment of FIG. 1.

FIG. 2 schematically illustrates optical configuration of the light source apparatus for resin curing 10 in the embodiment of FIG. 1.

The light source apparatus for resin curing 10 of this embodiment is configured to optically include a light source 15, a collecting reflection mirror 16 to which the light source 15 is mounted, a light-intensity adjustment mechanism 18 of rotation type inserted in a light path 17 for light reflected by the reflection mirror 16, a shutter mechanism 19 inserted in the light path 17 downstream of the light-intensity adjustment mechanism 18, a light intensity sensor 20 for detecting intensity of light emitted from the light source 15, and an optical fiber bundle 13 that leads the light spot to the object to be irradiated. In a modification of this embodiment, the light source 15 and the reflection mirror 16 may be united to form an integrated light source unit.

The light source 15 is configured by for example a metal halide lamp to emit ray in all wavelength bands containing an IR band ray, a visible light and a UV band ray. The light source 15 may be configured by a mercury-xenon lamp or a plurality of LED elements that can emit ray in all wavelength bands instead of the metal halide lamp.

The reflection mirror 16 is formed of a vapor-deposited aluminum mirror for example and has a spheroidal shape with a focus point at which the light source 15 is located. This reflection mirror 16 is configured to efficiently reflect the ray in all wavelength bands, that is, the ray in all wavelength bands (bands from 200 nm to 2500 nm, for example) containing an IR band ray, a visible light and a UV band ray (UV-A ultraviolet ray, UV-B ultraviolet ray and UV-c ultraviolet ray), emitted from the light source 15 and to focus the light. Instead of the vapor-deposited aluminum mirror, a vapor-deposited gold mirror may be used. Also, instead of the reflection mirror 16, a lens that focuses the ray in all wavelength bands emitted from the light source 15 may be used.

Figure 3:
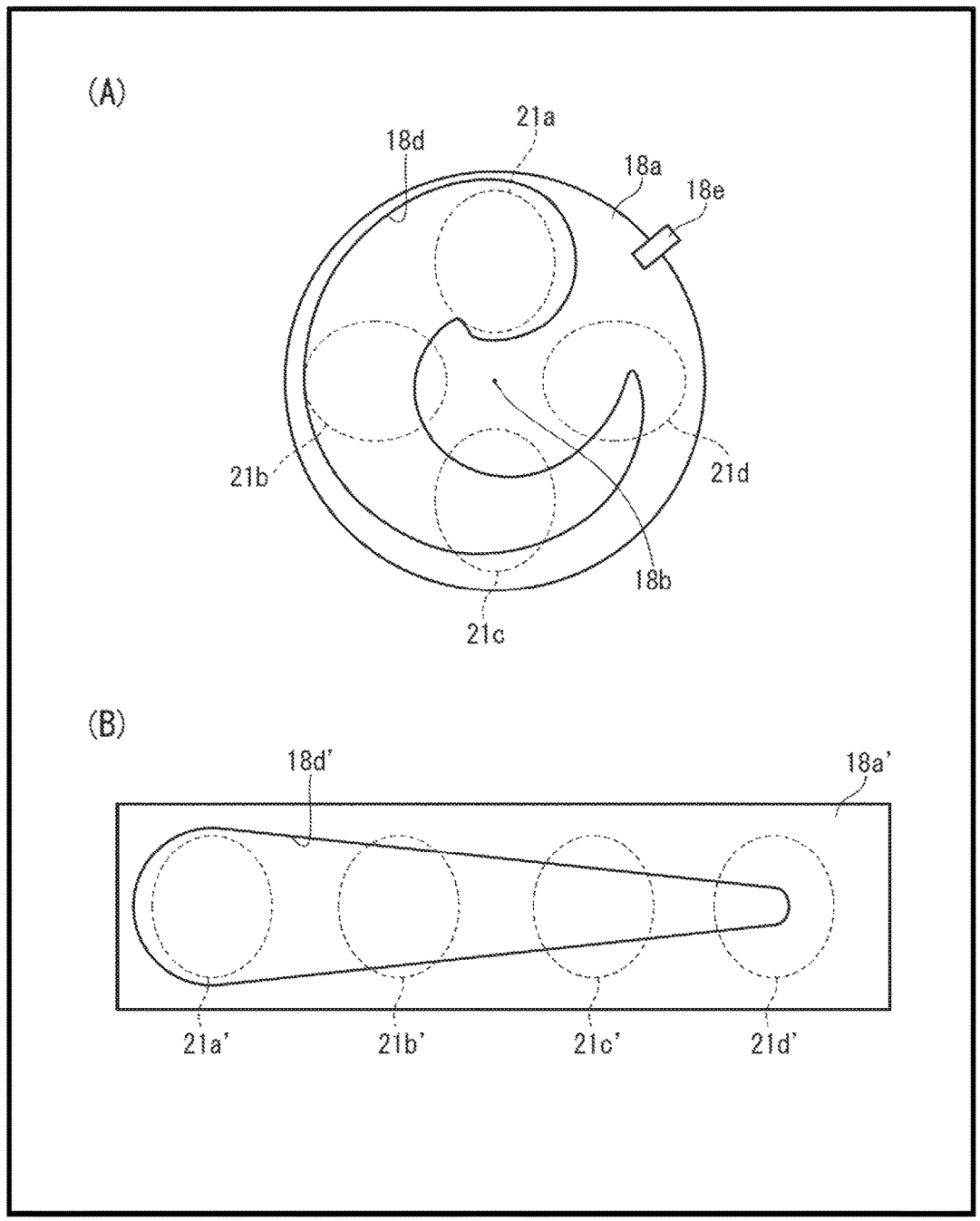
FIG. 3 is plane views schematically illustrating configurations of adjustment boards in light intensity adjustment mechanisms in the light source apparatuses for resin curing, (A) in the embodiment of FIG. 1 and (B) in its modification.

FIG. 3(A) schematically shows configuration, seen from the light source side, of an adjustment board in the light-intensity adjustment mechanism in the light source apparatuses for resin curing according to the embodiment of FIG. 1, and FIG. 3(B) schematically shows configuration, seen from the light source side, of an adjustment board in a light-intensity adjustment mechanism in a light source apparatuses for resin curing according to its modification. The light-intensity adjustment mechanism 18 in the embodiment has, as shown in FIG. 3(A) in detail, a rotation-type adjustment board 18a, a stepping motor for light-amount control 18c coaxially attached to the rotation-type adjustment board 18a to rotate this adjustment board 18a around a rotation axis 18b with a predetermined angle, an opening portion or aperture 18d formed in the adjustment board 18a, a projection for origin confirmation 18e formed on a circumference edge portion of the adjustment board 18a, and a photo-interrupter 18f for detecting passage of this projection for origin confirmation 18e.

The opening portion or aperture 18d has as shown in FIG. 3(A) a curved wedge shape having an area continuously changed depending on the rotation of the adjustment board 18a around the rotation axis 18b (depending on a rotating angle of the adjustment board 18a). Since all or a part of the light spot from the reflection mirror 16 passes this opening portion or aperture 18d, when the adjustment board 18a is rotated by the stepping motor 18c, the light intensity continuously changes depending on the rotating angle of this adjustment board 18a. It should be noted that when the light spot locates at the position of twelve o'clock in FIG. 3(A) as indicated by the light spot 21a, all (100%) of the light spot will pass through the aperture. Thus, in this case, the light intensity will become the maximum. When the adjustment board 18a rotates in the clockwise direction in the figure, the light flux of the passing light will continuously decrease to finally 0%. For example, in case of the light spot 21b at the position of nine o'clock in FIG. 3(A), in case of the light spot 21c at the position of six o'clock in FIG. 3(A), and in case of the light spot 21d at the position of three o'clock in FIG. 3(A), the transmitted light amount and thus the light intensity decreases depending on the rotating angle in this order. In other words, the light-intensity adjustment mechanism 18 of this embodiment can control the intensity of light depending on the rotating angle of the stepping motor 18c, and also can change the light intensity continuously. A rotary encoder not shown is attached to this stepping motor 18c and configured to detect the rotating angle of the stepping motor 18c by counting and to notify the detected angle to a programmable controller (PLC) 62 (FIG. 6) described below.

The photo-interrupter 18f is configured to detect the passage of the projection for the origin confirmation 18e formed on the circumference edge portion of the adjustment board 18a and to notify the detected passage of the projection to the PLC 62. Thus, it is possible to confirm the origin position of the adjustment board 18a and to precisely recognize the rotating position of the adjustment board 18a using this origin position and the rotating angle of the stepping motor 18c detected by the rotary encoder together. The confirmation of the origin position will be executed when the power switch is turned on.

As shown in FIG. 2, the rotation-type adjustment board 18a in this embodiment is mounted at a slant with respect to the optical path 17 and thus it is possible to reflect a part of the light from the reflection mirror 16 at the surface of this adjustment board 18a so as to make incident the part of the reflected light to the light intensity sensor 20. Output signal from the light intensity sensor 20 is sent to the PLC 62. The PLC 62 is configured to display the value of the output signal on the control panel 12. Thus, the intensity of the really emitted light from the light source 15 can be always confirmed. In a modification of this embodiment, instead of making the light reflected on the surface of the adjustment board 18a incident to the light intensity sensor 20, light transmitted through the adjustment board 18a is made incident to the light intensity sensor 20. The latter can reduce the manufacturing cost of the apparatus.

As for a modification of this embodiment, the light-intensity adjustment mechanism may be configured to move linearly. In this case, the rotation movement of the stepping motor is converted into the linear movement by using for example a rack-and-pinion gear to linearly drive in right and left a linear movement-type adjustment board 18a' as shown in FIG. 3(B). The linear movement-type adjustment board 18a' has an opening portion or aperture 18d'. This opening portion or aperture 18d' is provided with a linear wedge shape having an area continuously changed depending on the movement of the adjustment board 18a' in right and left. When the adjustment board 18a' linearly moves in left and right directions, the light intensity continuously changes depending on the position of this adjustment board 18a'. It should be noted that when the light spot locates at the left end position in FIG. 3(B) as indicated by the light spot 21a', all (100%) of the light spot will pass through the aperture. Thus, in this case, the light intensity will become the maximum. When the adjustment board 18a' linearly moves in the left direction in the figure, the light flux of the passing light will continuously decrease to finally 0%. For example, in case of the light spot 21*b'* at the next position in FIG. 3(B), in case of the light spot 21*c'* at the next position in FIG. 3(B), and in case of the light spot 21*d'* at the right end position in FIG. 3(B), the transmitted light amount and thus the light intensity decreases depending on the linearly moved position in this order. In other words, the light-intensity adjustment mechanism of this modification also can control the intensity of light depending on the rotating angle of the stepping motor, and also can change the light intensity continuously. In this modification, the origin position of the linear movement-type adjustment board 18*a'* is recognized by detecting passage of one end of right and left sides of the adjustment board 18*a'* using a photo interrupter not shown and by notifying the detected passage of the one end to the PLC 62.

It should be noted that the opening portions or apertures 18*d* and 18*d'* in the embodiment of FIG. 1 and its modification are configured so that the aperture areas are continuously changed. However, the opening portions or apertures 18*d* and 18*d'* may be configured to have another shapes whereby there aperture areas are discontinuously changed and therefore the light intensity is discontinuously changed.

Figure 4:
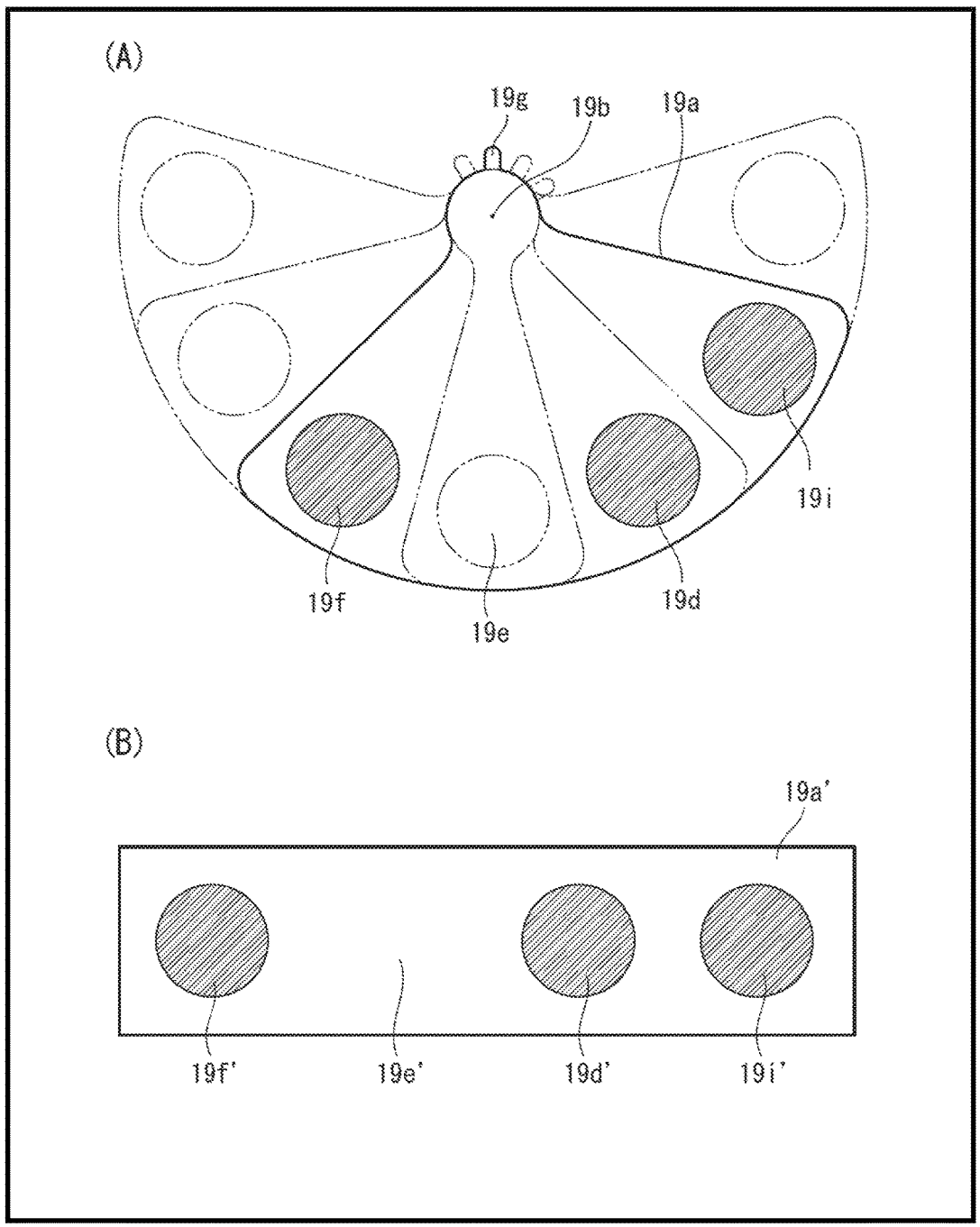
FIG. 4 is plane views schematically illustrating configurations of shutter boards in shutter mechanisms in the light source apparatuses for resin curing, (A) in the embodiment of FIG. 1 and (B) in its modification.

FIG. 4(A) schematically shows configuration of a shutter board in the shutter mechanism 19 in the light source apparatus for resin curing according to the embodiment of FIG. 1, and FIG. 4(B) schematically shows configuration of a shutter board in a shutter mechanism 19' in a light source apparatus for resin curing according to its modification. The shutter mechanism 19 in this embodiment has, as shown in FIG. 4(A) in detail, a rotation-type shutter board 19*a* with a sector shape, a stepping motor 19*c* for shutter coaxially attached to the rotation-type shutter board 19*a* to rotate or swing at high speed this shutter board 19*a* around a rotation axis 19*b*, an IR bandpass filter 19*d* provided on the shutter board 19*a*, a light interception portion 19*e* provided on the shutter board 19*a* adjacent to the IR bandpass filter 19*d*, a UV bandpass filter 19*f* provided on the shutter board 19*a* adjacent to the light interception portion 19*e*, a UV and IR bandpass filter 19*i* (corresponding to the light transmission section according to the present invention) provided on the shutter board 19*a* adjacent to and outer side (right side in the figure) of the IR bandpass filter 19*d*, for passing only ray containing a UV-C ultraviolet ray, a visible light except for the light with wavelength range from 500 nm to 640 nm, and an infrared ray, a projection for origin confirmation 19*g* formed on a circumference edge portion of the shutter board 19*a*, and a photo-interrupter 19*h* for detecting passage of this projection for origin confirmation 19*g*. In modification, the UV and IR bandpass filter 19*i* may be provided on the shutter board 19*a* adjacent to and outer side (left side in the figure) of the UV bandpass filter 19*f*.

The IR bandpass filter 19*d* in this embodiment is configured by a transmission filter or mirror provided with excellent heat-resistance and long-life stability and adapted for passing only the infrared ray (including some visible light). For example, this IR bandpass filter 19*d* prevents transmission of ray of approximately 400 nm or less, and allows transmission of ray of approximately 405 nm or more with a transmissivity of 95% or more. The IR bandpass filter 19*d* in this embodiment is configured to have a transmission property for passing only the infrared ray (including some visible light). However, any bandpass filter with a transmission property for passing various kinds of wavelength rays may be used in accordance with curing wavelength characteristics of the IR curing resin that is an object to be irradiated and with emission wavelength characteristics of the light source 15.

The light intercept portion 19*e* is configured as non-opening portion to cut off light applied without passing.

The UV bandpass filter 19*f* in this embodiment is configured by a transmission filter or mirror provided with excellent heat-resistance and long-life stability and adapted for passing only the ultraviolet ray (including some visible light). For example, this UV bandpass filter 19*f* prevents transmission of ray of approximately 250 nm or less and approximately 500 nm or more, and allows transmission of ray of approximately 300 nm to approximately 450 nm with a transmissivity of 90% or more. The UV bandpass filter 19*f* in this embodiment is configured to have a transmission property for passing only the ultraviolet ray (including some visible light). However, any bandpass filter with a transmission property for passing various kinds of wavelength lights may be used in accordance with curing wavelength characteristics of the UV curing resin that is an object to be irradiated and emission wavelength characteristics of the light source 15.

Figure 5:
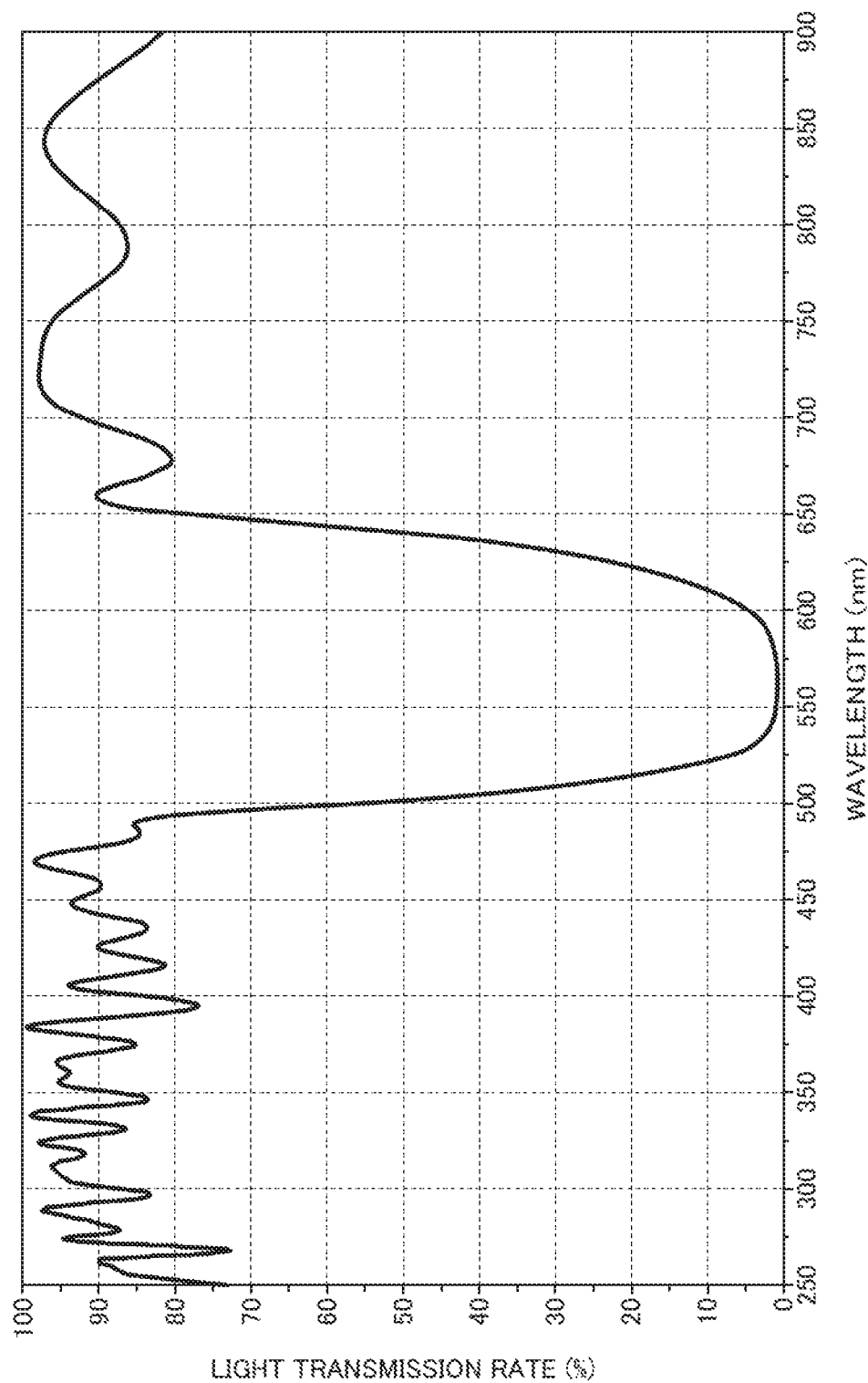
FIG. 5 is a graph illustrating characteristics of light transmission rate with respect to wavelength of a band pass filter in the shutter mechanism shown in FIG. 4 and in a first example.

The UV and IR bandpass filter 19*i* in this embodiment is configured by a transmission filter or mirror provided with excellent heat-resistance and long-life stability and adapted for passing the UV-C ultraviolet ray containing the ray in the wavelength range of 250 nm, the visible light except for the ray with wavelength range from 500 nm to 640 nm, and the infrared ray. An example of characteristics of light transmission rate with respect to wavelength of this UV and IR bandpass filter 19*i* is shown in FIG. 5. This example has characteristics of intercepting transmission of the light in the wavelength range of approximately 500 nm or more and approximately 640 nm or less among the visible light, and of passing the UV-C ultraviolet ray including at least ray in the wavelength range of 250 nm, of passing the visible light in the wavelength range of approximately 650 nm or more, and of passing the infrared ray, with the transmissivity of 90% or more. By inserting such UV and IR bandpass filter 19*i* into the light path 17, the resin can be cured in a short time without producing slime or stickiness (tackiness) on the resin surface. Not only the UV curing resin but also the IR curing resin can be efficiently hardened. Also, because the ray in the wavelength range from 500 nm to 640 nm that is unnecessary for resin curing is intercepted, it is possible to prevent unwanted heating of the object to be irradiated. The UV and IR bandpass filter 19*i* in this embodiment is configured to have a transmission property for passing only the ultraviolet ray (including some visible light) and the infrared ray (including some visible light). However, any bandpass filter with a transmission property for passing various kinds of wavelength rays may be used in accordance with curing wavelength characteristics of the UV curing resin that is an object to be irradiated and emission wavelength characteristics of the light source 15.

When the rotation-type shutter board 19*a* pivots around the rotation axis 19*b*, the IR bandpass filter 19*d*, the light interception portion 19*e*, the UV bandpass filter 19*f* or the UV and IR bandpass filter 19*i* is selectively inserted into the optical path 17. That is, the shutter mechanism 19 of this embodiment can select transmission of only infrared ray (including some visible light), interception of all band rays, transmission of only ultraviolet ray (including some visible light), or transmission of only infrared ray (including some visible light) and ultraviolet ray (including some visible light), depending on the rotating angle of the stepping motor. The IR bandpass filter 19*d* and the UV bandpass filter 19*f* are arranged respectively at both sides of the light interception portion 19*e* with respect to the rotating direction. Thus, according to the shutter mechanism 19 of this embodiment, interception of all band rays is certainly performed subsequent to the transmission of only infrared ray (including some visible light) or the transmission of only ultraviolet ray (including some visible light), and then the transmission of only ultraviolet ray (including some visible light) or the transmission of only infrared ray (including some visible light) is performed. In other words, according to this embodiment, at the time of change of ray between the transmission of only infrared ray and the transmission only of ultraviolet ray, it is possible to intercept all the rays into the object to be irradiated. Therefore, it is possible to prevent that the UV band ray irradiation is continuously performed just after the IR band ray irradiation, or that the IR band ray irradiation is continuously performed just after the UV band ray irradiation. Also, it is possible to cool the object to be irradiated during the interval between the both band ray irradiations. Further, according to this embodiment, since the IR bandpass filter 19d, the UV bandpass filter 19f and the UV and IR bandpass filter 19i are provided in the shutter mechanism 19, and attached to the rotation-type shutter board 19a driven by the stepping motor 19c, high-speed change of the light transmission bands can be attained. A rotary encoder not shown is attached to this stepping motor 19c and configured to detect a rotating angle of the stepping motor 19c by counting and to notify the detected angle to the PLC 62.

The photo-interrupter 19h is configured to detect the passage of the projection for the origin confirmation 19g formed on the circumference edge portion of the shutter board 19a and to notify the detected passage of the projection to the PLC 62. Thus, it is possible to confirm the origin position of the shutter board 19a and to precisely recognize the rotating position of the shutter board 19a using this origin position and the rotating angle of the stepping motor 19c detected by the rotary encoder together. The confirmation of the origin position will be executed when the power switch is turned on.

As for a modification of this embodiment, the shutter mechanism may be configured to move linearly. In this case, the rotation movement of the stepping motor is converted into the linear movement by using for example a rack-and-pinion gear to linearly drive in right and left a linear movement-type shutter board 19a' as shown in FIG. 4(B). The shutter board 19a' is provided with a UV and IR bandpass filter 19i', an IR bandpass filter 19d', a light interception portion 19e' and a UV bandpass filter 19f arranged along left and right directions (from right side in the drawing). When the linear movement-type shutter board 19a' linearly moves in left and right directions, the UV and IR bandpass filter 19i', the IR bandpass filter 19d', the light interception portion 19e' or the UV bandpass filter 19f is inserted in the light path 17 depending on the position of this shutter board 19a'. That is, the shutter mechanism of this modification also can switch at high-speed the light transmission bands depending on the rotation of the stepping motor, and also can change the light intensity continuously. In this modification, the origin position of the linear movement-type shutter board 19a' is recognized by detecting passage of one end of right and left sides of the shutter board 19a' using a photo interrupter not shown and by notifying the detected passage of one end to the PLC 62.

The optical fiber bundle 13 is formed by making into a bundle a plurality of quartz fibers made of such as quartz glasses having a high transmissivity in ultraviolet ray band, and has an incidence section 13a arranged, in the light path 17, near the focus point of reflected light from the reflection mirror 16, an emission section 13b for emitting the spot light to be irradiated to an object, and a coating layer 13c for covering the outer peripheral surface of the optical fiber bundle 13.

Figure 6:
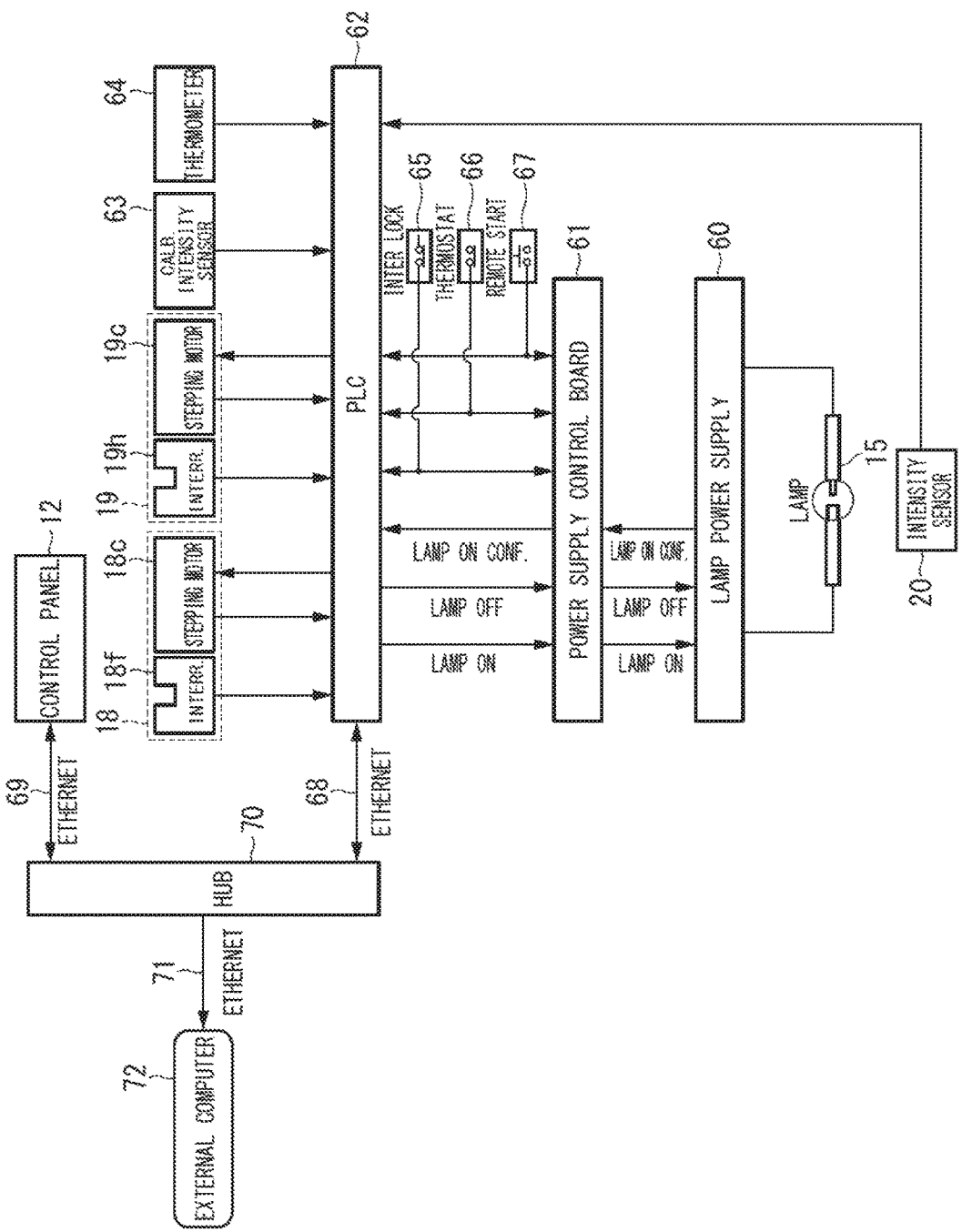
FIG. 6 is a block diagram schematically illustrating electric configuration of the light source apparatus for resin curing in the embodiment of FIG. 1.

FIG. 6 schematically illustrates electric configuration of the light source apparatus for resin curing 10 in the embodiment of FIG. 1.

The light source apparatus for resin curing 10 in this embodiment electrically constitutes of the light source 15 configured by in this embodiment the mercury-xenon lamp, a lamp power supply electrically connected to the light source 15 for supplying a lamp current, a lamp power supply control board 61 electrically connected to the lamp power supply 60, the PLC 62 electrically connected to the lamp power supply control board 61, the stepping motor 18c and the photo-interrupter 18f of the light-intensity adjustment mechanism 18, electrically connected to the PLC 62, the stepping motor 19c and the photo-interrupter 19h of the shutter mechanism 19, electrically connected to the PLC 62, a calibration light-intensity sensor 63 electrically connected to the PLC 62, a thermometer 64 for the object to be irradiated, electrically connected to the PLC 62, an interlock switch 65 electrically connected to the PLC 62, for detecting whether a cover (not shown) of the housing 11 is closed or not, a thermostat 66 electrically connected to the PLC 62, for detecting overheat around the light source 15 and notifying the overheat to the PLC 62, a remote start switch 67 electrically connected to the PLC 62, the aforementioned control panel 12 electrically connected to the PLC 62 through Ethernets® 68 and 69 and a hub 70, the aforementioned light-intensity sensor 20 electrically connected to the PLC 62, and an external computer 72 electrically connected to the PLC 62 through Ethernets® 71 and 68 and the hub 70.

The PLC 62 is a computer provided with therein a CPU, memories, an input-output interface, an A/D converter, an Ethernet® terminal, an inverter function, a pulse output function and a high speed counter function, for executing control in accordance with the orders and conditions prescribed by a program. The PLC having such kind of functions is commercially available (for example, a programmable controller CP1E manufactured by OMRON Corporation).

The stepping motor 18c of the light-intensity adjustment mechanism 18 is configured to be driven by a driver (not shown) in response to pulses outputted from the PLC 62. The counted value from the rotary encoder (not shown) for counting the rotating angle of the stepping motor 18c is inputted into the PLC 62. Thus, the PLC 62 can quickly and precisely rotate the rotation-type adjustment board 18a of the light-intensity adjustment mechanism 18 to a desired angle, and can recognize the rotating position of the adjustment board 18a with a high degree of accuracy.

Also, the stepping motor 19c of the shutter mechanism 19 is configured to be driven by a driver (not shown) in response to pulses output from the PLC 62. The counted value from the rotary encoder (not shown) for counting the rotating angle of the stepping motor 19c is inputted into the PLC 62. Thus, the PLC 62 can quickly and precisely rotate the rotation-type shutter board 19a of the shutter mechanism 19 to a desired angle, and can recognize the rotating position of the shutter board 19a with a high degree of accuracy.

The calibration light-intensity sensor 63 is optically coupled to the emission section 13b of the optical fiber bundle 13 only when the light energy of the light spot emitted to the object to be irradiated is calibrated, and configured to provide a voltage corresponding to the light intensity (W/cm$^2$) of the light spot and to send the output voltage to the PLC 62. As for such calibration light-intensity sensor 63, for example, a thermopile (a plurality of thermocouples) that has flat response characteristics in both regions of the IR band and the UV band and can be commonly utilized in the both regions may be used. The output voltage properties with respect to the input optical power of the calibration light-intensity sensor 63 are previously known and stored in the memory of the PLC 62. The calibration will be carried out by the PLC 62. That is, calibrated characteristics of the output light intensity with respect to the rotating angle of the stepping motor 18c can be obtained by rotating the adjustment board 18a of the light-intensity adjustment mechanism 18 to have a desired light intensity for calibration (output voltage of the calibration light-intensity sensor 63) and by storing the rotating angle of the stepping motor 18c at that time in the memory of the PLC 62.

The thermometer 64 is a temperature detector installed as necessary and configured by a thermocouple for detecting the temperature of the object to be irradiated. The detected output of this thermometer 64 is sent to the PLC 62. The PLC 62 therefore can display, for example on the control panel 12, the temperature of the object to be irradiated and can notify the temperature to a necessary external equipment such as the external computer 72.

The interlock switch 65 detects the state where the cover of the housing 11 is opened and notifies the detected state to the PLC 62. The PLC 62 can thereby stop all the operations of the light source apparatus for resin curing 10 until the cover is closed. Also, the PLC 62 can display on the control panel 12, for example, that the cover is opened.

The thermostat 66 detects overheat around the light source 15 and notifies the overheat to the PLC 62. The PLC 62 can thereby bring the light source 15 to an unlighted state until the overheat state is finished.

The remote start switch 67 is, for example, a foot switch, capable of starting the recipe process described later by the remote control from the outside.

The light intensity sensor 20 detects the intensity of the incident light emitted from the light source 15 and reflected at a part of the surface of the rotation-type adjustment board 18a except for the opening portions or apertures 18d and sends the detection output to the PLC 62. The PLC 62 can thereby recognize the light intensity of the light emitted from the light source 15 and reflected on the surface of the rotation-type adjustment board 18a, namely the light intensity of the reflected light that is the remains of the light transmitted through the rotation-type adjustment board 18a (the light intensity of the irradiated light can be obtained from this). The voltage corresponding to the intensity of the reflected light is displayed on the control panel 12 to enable monitoring of the light intensity of the irradiated light. In a modification of this embodiment, the intensity of the light reflected on the surface of the rotation-type adjustment board 18a is not detected by the light intensity sensor 20 but the intensity of the light transmitted through the rotation-type adjustment board 18a is detected by a light intensity sensor.

The control panel 12 is formed from the touch panel-type displays of liquid crystal and configured to display various information in a main process, a receipt process and a calibration process described below in response to instructions from the PLC 62, and to transfer the information touch-inputted by an operator to the PLC 62.

The external computer 72 is connected to this light source apparatus for resin curing 10 as necessary so that the operations of this light source apparatus 10 can be controlled from the outside. Because the remote control of this external computer 72 does not relate to the present invention directly, detail explanation is omitted in this specification.

In modifications of this embodiment, moved positions of the linear movement-type adjustment board 18a' of the light-intensity adjustment mechanism and the linear movement-type shutter board 19a' of the shutter mechanism can be controlled by similarly controlling the stepping motors.

Figure 7:
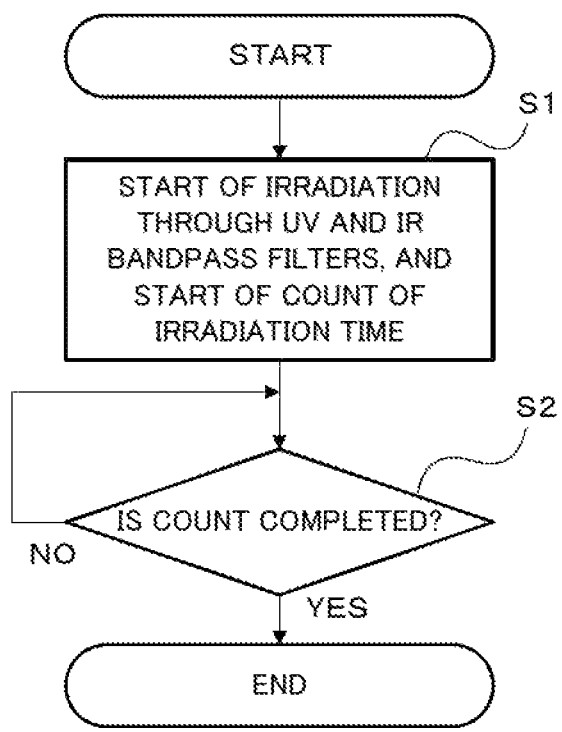
FIG. 7 is a flow chart illustrating a flow of a part of programs in a programmable controller (PLC) of FIG. 6.
Figure 8:
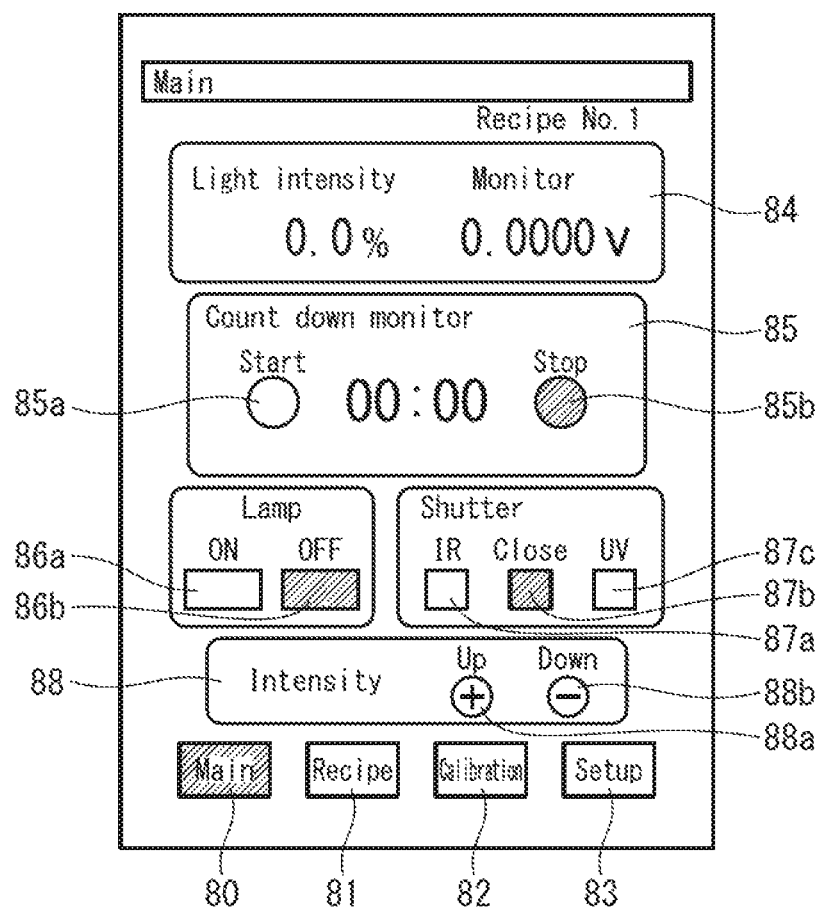
FIG. 8 is a view showing a main process screen displayed on a control panel of the light source apparatus for resin curing in the embodiment of FIG. 1 and in its modification.
Figure 9:
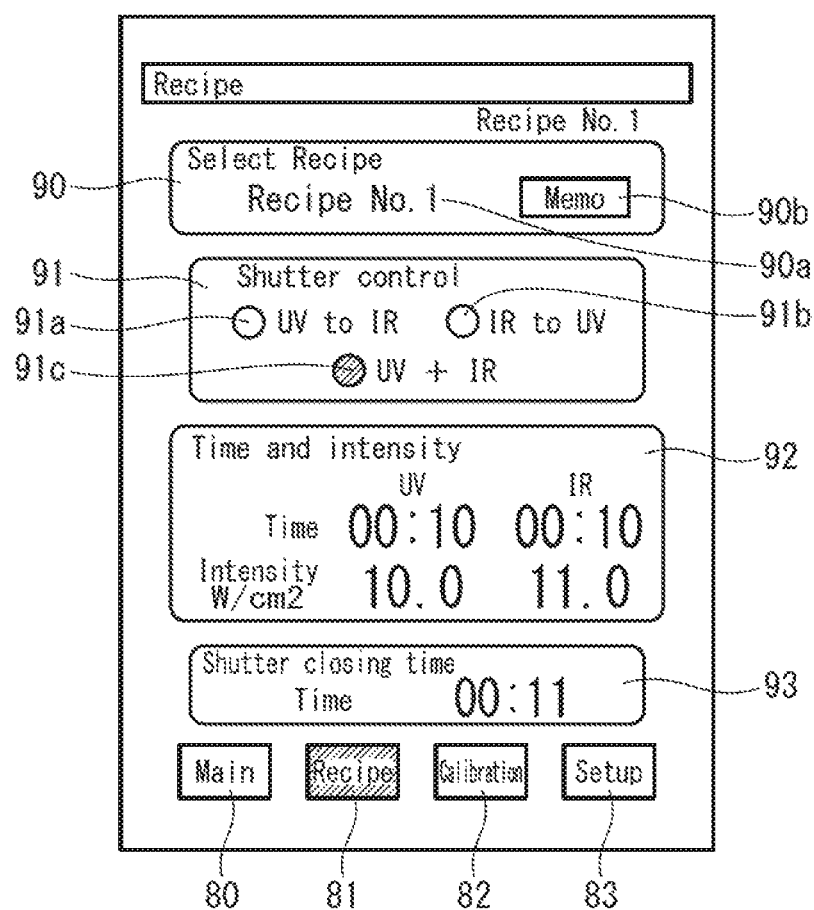
FIG. 9 is a view showing a recipe process screen displayed on a control panel of the light source apparatus for resin curing in the embodiment of FIG. 1 and in its modification.
Figure 10:
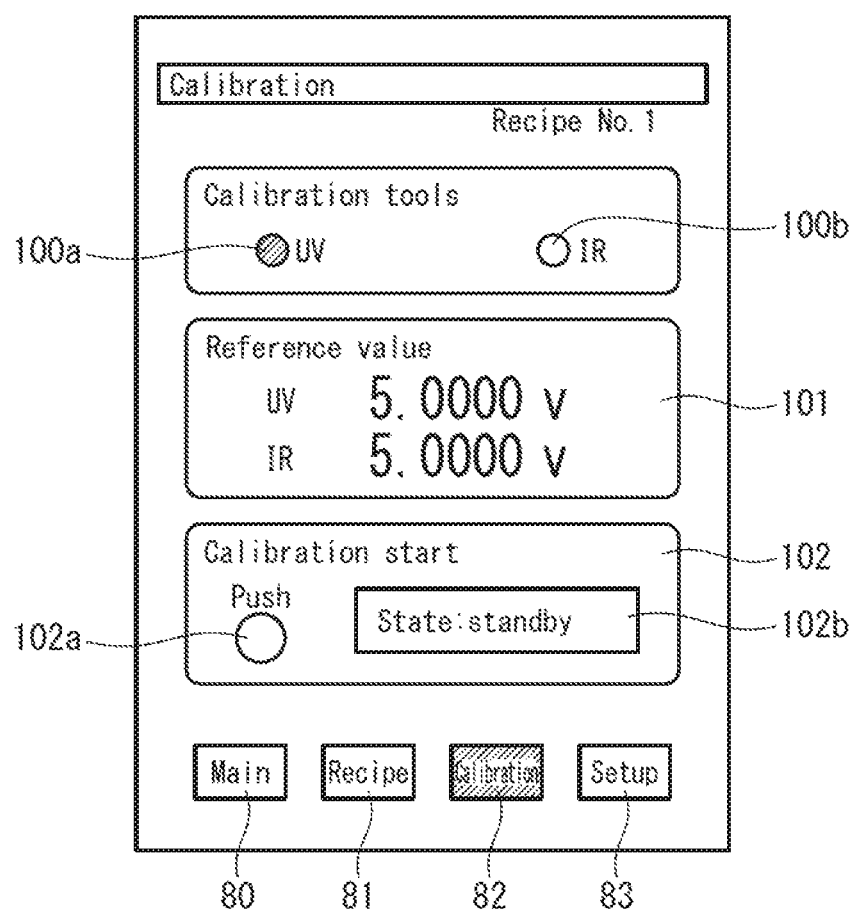
FIG. 10 is a view showing a calibration process screen displayed on the control panel of the light source apparatus for resin curing in the embodiment of FIG. 1 and in its modification.

FIG. 7 shows a flow of the programs of the recipe process in the PLC 62, FIG. 8 shows a main process screen displayed on the control panel 12, FIG. 9 shows a recipe process screen displayed on the control panel 12, and FIG. 10 shows a calibration process screen displayed on the control panel 12.

Hereinafter, operations of the PLC 61 in the light source for resin curing 10 will be described.

In order to start the operation of the light source apparatus for resin curing 10, a power switch (not shown) is first turned on. The main process screen (Main) shown in FIG. 8 is thereby displayed on the control panel 12. In the main process screen, displayed are, a recipe name (Recipe No. 1), a main button 80 to transit into the main process (Main), a recipe button 81 to transit into the recipe process (Recipe), a calibration button 82 to transit into the calibration process (Calibration), a setup button 83 to transit into the setup process (Setup), a display region 84 of a monitor voltage (Monitor) that is the detected output of the light intensity sensor 20 (Light intensity), a countdown monitor region 85 for displaying each process time of the shutter mechanism 19 (Count down monitor), a start button 85a (Start) and a stop button 85b (Stop) displayed in this countdown monitor region 85, an on button 86a (ON) and an off button 86b (OFF) of the light source (Lamp), an IR bandpass filter button 87a (IR), a light interception button 87b (Close) and a UV bandpass filter button 87c (UV) for manual operation of the shutter mechanism (Shutter), a light-intensity adjustment region 88 for adjusting the light intensity (Light intensity), and an up button 88a (+) and a down button 88b (−) of the light intensity displayed in the region 88. When each button is touched, the corresponding instruction is inputted into the PLC 62 and the button turns on. While the light source for resin curing 10 is operating, the touch input from the control panel 12 becomes invalid basically.

The example shown in FIG. 8 is selecting the first recipe (Recipe No. 1). In this first recipe, the ray is irradiated through the UV and IR bandpass filter 19i (irradiation time is 10 seconds and light intensity is 10.0 w/cm$^2$ for example).

In another recipe, first the light is irradiated through the UV bandpass filter 19f (irradiation time is 10 seconds and light intensity is 10.0 w/cm$^2$), then the light irradiation is intercepted by the light interception portion 19e to cool the object to be irradiated (light interception time is 10 seconds), and thereafter the light is irradiated through the IR bandpass filter 19d (irradiation time is 10 seconds and light intensity is 11.0 w/cm$^2$).

In order to perform an optimum resin curing, it is possible to set and to register various recipes with changed parameters such as presence or absence of irradiation of light transmitted through the UV and IR bandpass filter 19i, an irradiation time of the transmitted light, a light intensity of the transmitted light, an irradiation order of the transmitted light through the IR bandpass filter 19d and the UV bandpass filter 19f, presence or absence of irradiation of each transmitted light, an irradiation time of each transmitted light, a light intensity of each transmitted light, presence or absence of the light interception (cooling) between the irradiation of both transmitted lights, and a light interception time (cooling time). Also, it is possible to select a desired recipe from the registered plurality of recipes and to perform the selected desired recipe.

On this main process screen, when the on button 86a of the light source 15 is touched, an instruction for lighting the lamp is sent to the lamp power supply control board 61 from the PLC 62, then an instruction for lighting the lamp is sent to the lamp power supply 60 from the lamp power supply control board 61, and thus the light source 15 turns on. When the light source 15 turns on, the voltage applied to the light source at that time is detected and a lamp-on confirmation signal is sent from the lamp power supply 60 to the lamp power supply control board 61 and then to the PLC 62. Thus, the PLC 62 can confirm that the light source 15 turns on. When the off button 86b of the light source 15 is touched, an instruction for lighting out the lamp is sent to the lamp power supply control board 61 from the PLC 62, then an instruction for lighting out the lamp is sent to the lamp power supply 60 from the lamp power supply control board 61, and thus the light source 15 turns off. If the IR bandpass filter button 87a or the UV bandpass filter button 87c is touched, since the rotation-type shutter board 19a of the shutter mechanism 19 rotates, the light transmission band can be manually controlled. Also, if the up button 88a (+) of the light intensity or the down button 88b (−) of the light intensity is touched, since the rotation-type adjustment board 18a of the light-intensity adjustment mechanism 18 rotates, the light intensity can be manually controlled.

Following to the lighting of the light source 15, if the count-start button 85a in the countdown monitor region 85 is touched, a recipe process selected is started.

FIG. 9 shows an example of the recipe process screen displayed when the plurality of recipe processes are set and registered, and then one of the registered recipe processes is selected. When the recipe button 81 on the main process screen is touched, this recipe process screen is displayed. In the recipe process screen, displayed are, a recipe name (Recipe No. 1), a recipe selection region 90 (Select Recipe), a recipe number portion 90a and a memo button 90b (Memo) displayed in this region 90, a UV→IR button 91a (UV to IR), an IR→UV button 91b (IR to UV) and an IR and UV button 91c (IR+UV) displayed in a shutter control region 91 (Shutter control) indicating usage of the UV and IR bandpass filter, the UV bandpass filter and the IR bandpass filter of the shutter mechanism 19, a region 92 for displaying an irradiation time (Time) and a light intensity (Intensity) of the UV bandpass filter and the IR bandpass filter, and a region 93 for displaying a light interception time (Shutter closing time) of the light interception portion. When the recipe number portion 90a of the recipe selection region 90 is touched and a numerical value is inputted, a recipe corresponding to the inputted numerical value is automatically called. If the recipe is changed on the screen, the recipe is automatically saved. When the memo button 90b is touched, a memo in this recipe can be confirmed. As the memo, 40 characters for example can be inputted.

In case that the first recipe process shown in FIG. 9 is set, when the UV and IR button 91c on the recipe process screen is touched (only this button can be touched on the recipe process screen), a setting window (not shown) of the irradiation time of the UV and IR bandpass filter 19i is displayed on the recipe process screen to enable the setting of the irradiation time. After the setting of the irradiation time, when the start button 85a in the main process screen is touched, irradiation of light through the UV and IR bandpass filter 19i is started and count of a timer corresponding to the irradiation time is performed (Step S1 of FIG. 7). Since only the irradiation through the UV and IR bandpass filter 19i is performed in the first recipe process, the PLC 62 sends pulses of the predetermined number to the stepping motor 19c for quickly rotating the rotation-type shutter board 19a by a predetermined angle so that the UV and IR bandpass filter 19i is inserted in the light path 17. The irradiation to the object to be irradiated of the light in the UV and IR band is thereby started. More detail operations at the time of the irradiation start is as follows. First when the start button 85a is touched, the stepping motor 18c of the light-intensity adjustment mechanism 18 is driven to rotate the rotation-type adjustment board 18a by a predetermined angle. Thus, the light intensity of the irradiation light is set, and the set intensity value is detected by the light intensity sensor 20 and displayed on the control panel 12. Following to this, the stepping motor 19c of the shutter mechanism 19 is driven to rotate the rotation-type shutter board 19a by a predetermined angle. Thus, the UV and IR bandpass filter 19i is inserted in the light path 17 and irradiation of the light in the UV and IR band is performed. The rotation-type shutter board 19a is set at the beginning and at the inactive conditions to the initial position where the light interception portion 19e is inserted in the light path 17.

Then, it is judged whether the count of the timer is finished or not (Step S2 of FIG. 7). Because in this first recipe it is set to perform the irradiation through the UV and IR bandpass filter 19i for ten seconds, the timer is set for ten seconds. It should be noted that since the light intensity at that time is set in 100% that is the maximum light intensity, the PLC 62 sends to the stepping motor 18c pulses of a predetermined number so as to rotate the rotation-type adjustment board 18a by a predetermined angle resulting to adjust the light intensity of the irradiation light to 100%, the maximum light intensity.

When it is judged that the count is not finished (in case of NO at the Step S2), the irradiation is continued and judgement at this Step S2 is repeated. When the irradiation time is passed over ten seconds and thus it is judged that the count is finished (in case of YES at the Step S2), the rotation-type adjustment board 18a is rotated by a predetermined angle so that the light interception portion 19e is inserted in the light path 17 and the irradiation light is cut off to complete the process of FIG. 7.

FIG. 10 shows an example of the calibration process screen. When the calibration button 82 in the main process screen is touched, this calibration process screen is displayed. In the calibration process screen, displayed are, a recipe name (Recipe No. 1), a UV button 100a for calibration in the UV band and an IR button 100b for calibration in the IR band, displayed in a calibration tool region (Calibration tools), a reference value region 101 (Reference value) for displaying an output voltage of the calibration light intensity detector 63, and a start button 102a and a situation display region 102b (State) displayed in a calibration start region 102 (Calibration start).

As aforementioned, the calibration process is performed by optically coupling the calibration light intensity detector 63 of the calibration tool with the emission section 13b of the optical fiber bundle 13. When an output voltage of the calibration light intensity detector 63, which is a reference value corresponding to the desired light intensity to be calibrated in the UV band and the IR band is inputted, this value is displayed in the reference value region 101. Then when the UV button 100a or the IR button 100b is touched, the PLC 62 rotates the rotation-type adjustment board 18a of the light-intensity adjustment mechanism 18 so that the output voltage of the calibration light intensity detector 63 becomes equal to the reference value, and the PLC 62 stores the rotating angle of the stepping motor 18c at that time in the memory. As a result, the apparatus is calibrated as that if the rotating angle of the stepping motor 18c becomes this value, the light with the desired light intensity will be outputted. By performing such calibration process, it is possible to always obtain the same light intensity even when a radiation output of the light source 15 changes or the light source 15 is exchanged.

As discussed above in detail, according to this embodiment, the UV and IR bandpass filter 19i provided in the shutter mechanism 19 is selectively inserted in the light path 17 from the light source 15. The ray constituted by a UV-C ultraviolet ray containing the ray in the wavelength range of 250 nm, a visible light except for the light in the wavelength range from 500 nm to 640 nm and an infrared ray are thereby simultaneously applied to the object to be irradiated. Therefore, a UV curing resin can be quickly hardened without producing any tackiness on its resin surface. Also, according to this embodiment, not only the UV curing resin but also the IP curing resin can be efficiently hardened. Further, since the UV and IR bandpass filter 19i, the IR bandpass filter 19d, the UV bandpass filter 19f and the light interception portion 19e can be formed in the existing shutter mechanism, it is possible to utilize the conventional light source apparatus for resin curing by partly modifying without performing major design modification so as to additionally obtain a function of irradiation and interception of ray for IR curing resin and a function of irradiation and interception of ray for UV curing resin. Therefore, development of new apparatus becomes needless to extremely decrease the manufacturing cost of the light source apparatus for resin curing. Still further, in order to perform an optimum resin curing that will be different depending on applications, it is possible to set and to register various recipes with changed parameters such as presence or absence of irradiation of ray transmitted through the UV and IR bandpass filter 19i, an irradiation time of the transmitted light, a light intensity of the transmitted ray, an irradiation order of the transmitted light through the IR bandpass filter 19d and the UV bandpass filter 19f, presence or absence of irradiation of each transmitted ray, an irradiation time of each transmitted light, a light intensity of each transmitted ray, presence or absence of the light interception (cooling) between the irradiation of both transmitted rays, and a light interception time (cooling time). Also, it is possible to select a desired recipe from the registered plurality of recipes and to perform the selected desired recipe.

It should be noted that it was impossible to completely remove tackiness on the resin surface even if only the ray in the UV wavelength range was irradiated to the UV curing resin, even if only the ray in the IR wavelength range was irradiated to the UV curing resin, even if the ray in the IR wavelength range was irradiated after the ray in the UV wavelength range was irradiated to the UV curing resin, or even if the ray in the UV wavelength range was irradiated after the ray in the IR wavelength range was irradiated to the UV curing resin. Under these circumstances, tackiness had been removed conventionally by performing both the UV curing process using the UV curing apparatus of emitting ray in the dominant wavelength of 365 nm and the heat treatment using a heat ray oven as previously described. Whereas according to this embodiment, a UV-C ultraviolet ray containing ray in the wavelength range of 250 nm, a visible light except for ray with wavelength range from 500 nm to 640 nm, and an infrared ray are irradiated together so that the UV curing resin is hardened without exposing it to air and thus both the UV curing and the tackiness removal can be implemented at the same time.

Also, the light-intensity adjustment mechanism 18 is configured so that the opening portion or aperture 18d of the rotation-type adjustment board 18a or the opening portion or aperture 18d' of the linear movement-type adjustment board 18a' has the curved wedge shape with an area continuously changed, and this area of the opening portion or aperture inserted in the light path 17 is continuously changed in accordance with the drive of the stepping motor 18c. Therefore, the light intensity can be controlled depending on the rotating angle of the stepping motor 18c and can be continuously and precisely changed.

Furthermore, since the light-intensity adjustment mechanism 18 is configured so that the rotation-type adjustment board 18a or the linear movement-type adjustment board 18a' is driven by the stepping motor 18c and that the rotating angle of the stepping motor 18c is counted by the rotary encoder, it is possible to quickly and precisely move the rotation-type adjustment board 18a or the linear movement-type adjustment board 18a' to the desired angle or position and to recognize the angle or the position with a high degree of accuracy. In addition, since the shutter adjustment mechanism 19 is configured so that the rotation-type shutter board 19a or the linear movement-type shutter board 19a' is driven by the stepping motor 19c and that the rotating angle of the stepping motor 19c is counted by the rotary encoder, it is possible to quickly and precisely move the rotation-type shutter board 19a or the linear movement-type shutter board 19a' to the desired angle or position and to recognize the angle or the position with a high degree of accuracy.

In the described embodiment and modification, operations of the light source apparatus for resin curing 10 is controlled by the PLC 62, but instead of the PLC 62, the operations may be controlled by another control device. For example, the similar control can be performed using other personal computer and pulse controller.

Figure 11:
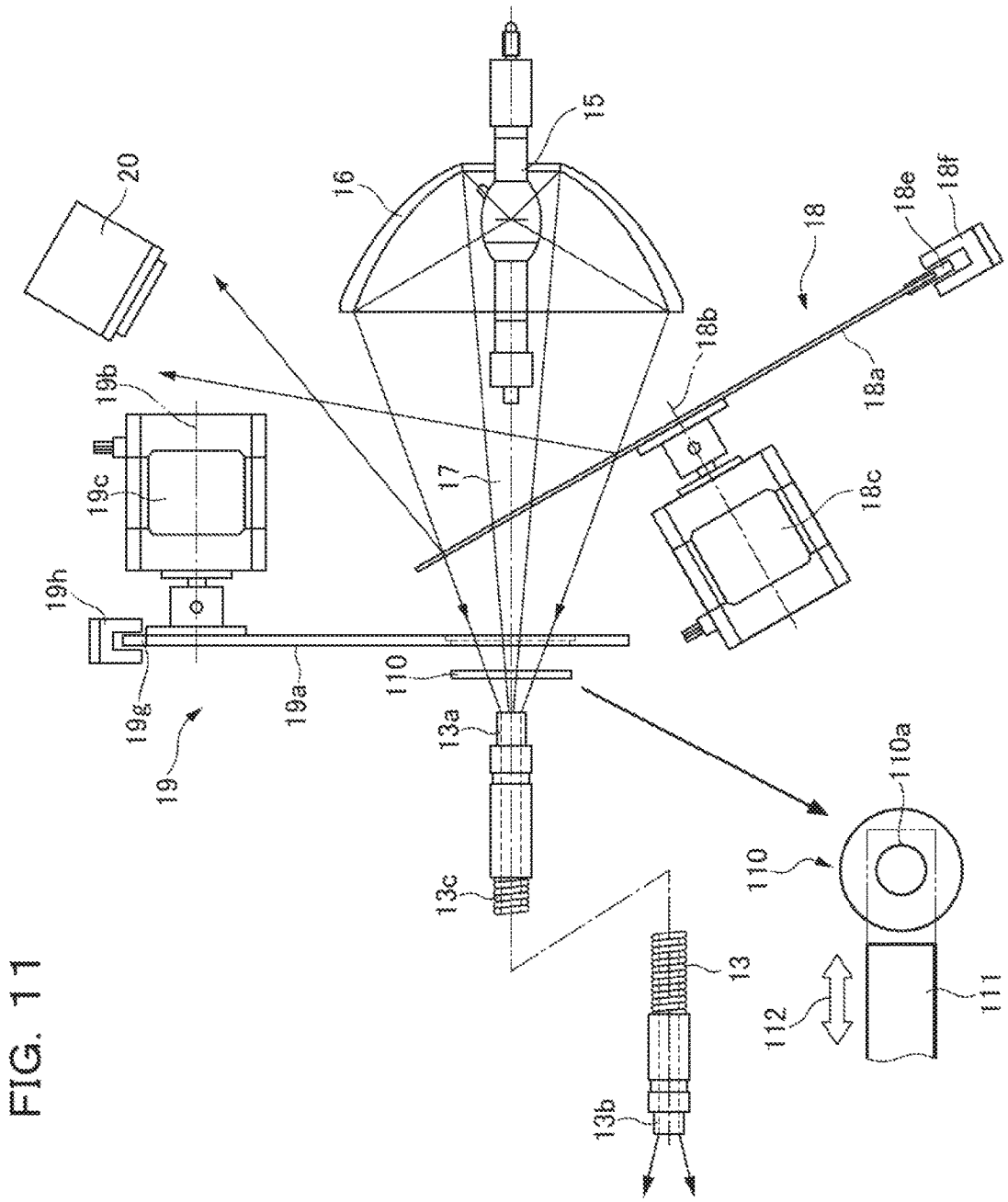
FIG. 11 is a plane view schematically illustrating optical configuration of a light source apparatus for resin curing in another embodiment according to the present invention.

FIG. 11 schematically illustrates optical configuration of a light source apparatus for resin curing in another embodiment according to the present invention.

The light source apparatus for resin curing in this embodiment is configured to optically include a light source 15, a collecting reflection mirror 16 to which the light source 15 is mounted, a light-intensity adjustment mechanism 18 of rotation type inserted in a light path 17 for light reflected by the reflection mirror 16, a shutter mechanism 19 inserted in the light path 17 downstream of the light-intensity adjustment mechanism 18, a light intensity sensor 20 for detecting intensity of light emitted from the light source 15, an optical fiber bundle 13 that leads the light spot to the object to be irradiated, and a low band-reject filter mechanism 110 inserted in the light path 17 downstream of the shutter mechanism 19 in this embodiment. In a modification of this embodiment, the light source 15 and the reflection mirror 16 may be united to form an integrated light source unit.

Because the configurations, functions and advantages of the light source 15, the reflection mirror 16, the light-intensity adjustment mechanism 18, the shutter mechanism 19, the light intensity sensor 20 and the optical fiber bundle 13 are the same as these of the embodiment of FIG. 1 to FIG. 10, explanations are omitted.

The low band-reject filter mechanism 110 is configured to convert the rotation movement of for example a stepping motor (not shown) into the linear movement by using for example a rack-and-pinion gear so that a low band-reject filter 111 can be inserted in a part of or entire of a light focusing region 110a of the light path 17. That is, as shown by arrow 112 in FIG. 11, the low band-reject filter mechanism 110 is configured to slidably move the low band-reject filter 111 in right and left so as to insert the filter 111 in a part of or entire of the light focusing region 110*a*, or so as to pick the filter 111 out of the light focusing region 110*a*.

The low band-reject filter 111 has light transmission characteristics that can attenuate the UV-C ultraviolet ray in some bands. Therefore by slidably inserting at least part of the low band-reject filter 111 in the light path 17, the transmission energy of the UV-C ultraviolet ray near 254 nm can be appropriately attenuated depending on the inserted amount of the filter 111. The low band-reject filter 111 also has light transmission characteristics with a high transmission rate for the UV-A ultraviolet ray in a dominant wavelength of 365 nm that affects the UV curing.

Figure 12:
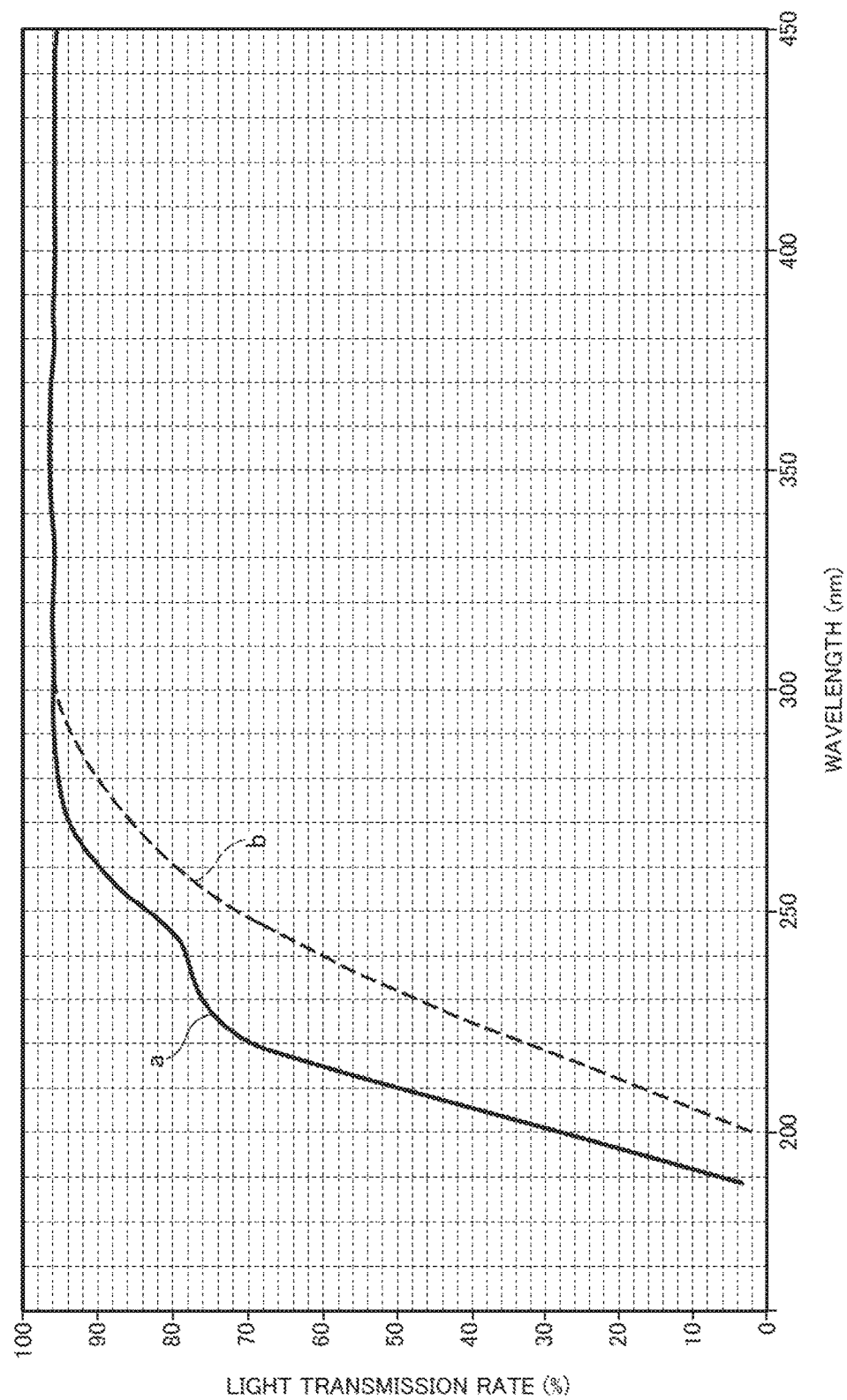
FIG. 12 is a graph illustrating characteristics of light transmission rate with respect to wavelength of a high pass filter in the embodiment of FIG. 11 and in its modification.

FIG. 12 shows characteristics of light transmission rate with respect to wavelength of a fused silica glass plate and a vapor deposition type low band-reject filter (LWPF-300) that are examples of the low band-reject filter ilia. In the figure, "a" indicates the characteristics of the fused silica glass plate, and "b" indicates the characteristics of the vapor deposition type low band-reject filter. The fused silica glass plate is cheaper and superior in the heat resistance than the vapor deposition type low band-reject filter.

In order to effectively remove the tackiness on the resin surface, it is of value to irradiate simultaneously the ultraviolet ray near the wavelength of 365 nm that is the dominant wavelength for UV curing (UV curing dominant wavelength), the ultraviolet ray near the wavelength of 254 nm (tackiness removal wavelength) and the infrared ray. However, because there may be various chemical agents having different wavelength sensitivity properties, it is desired that a ratio of relative intensities between the ray in the UV curing dominant wavelength and the ray in the tackiness removal wavelength can foe adjusted freely. To this end, it is considered that an optical element such as a transmission bandpass filter for transmitting ray in each wavelength range or a reflection bandpass filter for reflecting ray in each wavelength range is inserted in the light path, but such transmission bandpass filter and reflection bandpass filter are expensive causing the cost of the overall system to increase.

Thus, as this embodiment, if it is configured that a part of or entire of the low band-reject filter 111 made of the fused silica glass plate is inserted in the light path 17, the energy amount of the tackiness removal wavelength (the ultraviolet ray in the wavelength near 254 nm) arrived at the incidence section 13*a* of the optical fiber bundle 13 can be reduced depending on the insertion degree of the filter 111. Since the low band-reject filter 111 has an extremely high transmission rate of the ultraviolet ray near the wavelength of 365 nm that is the dominant wavelength for UV curing (UV curing dominant wavelength), attenuation of the dominant wavelength for UV curing (UV curing dominant wavelength) is very few even if this filter 111 is inserted in the light path. That is, according to this embodiment, by executing easy and simple operations for moving the low band-reject filter 111 in and out of the light path 17, a ratio of relative intensities between the ray in the UV curing dominant wavelength and the ray in the tackiness removal wavelength at the incidence section 13*a* of the optical fiber bundle 13 is freely adjusted.

As shown in FIG. 12, the light transmission rate of the fused silica glass plate is similar to that of the vapor deposition type low band-reject filter (LWPF-300), this fused silica glass plate can be used as the low band-reject filter 111 without being processed (vapor deposited). Also, not only the cost of the overall system can be reduced because of cheapness of the fused silica glass plate, but also the damage caused by heating can be prevented. Although the cost will increase, the vapor deposition type low band-reject filter (LWPF-300) may be used instead of the fused silica glass plate.

Another functions and advantages of this embodiment are the same as these of the embodiment of FIG. 1 to FIG. 10.

Figure 13:
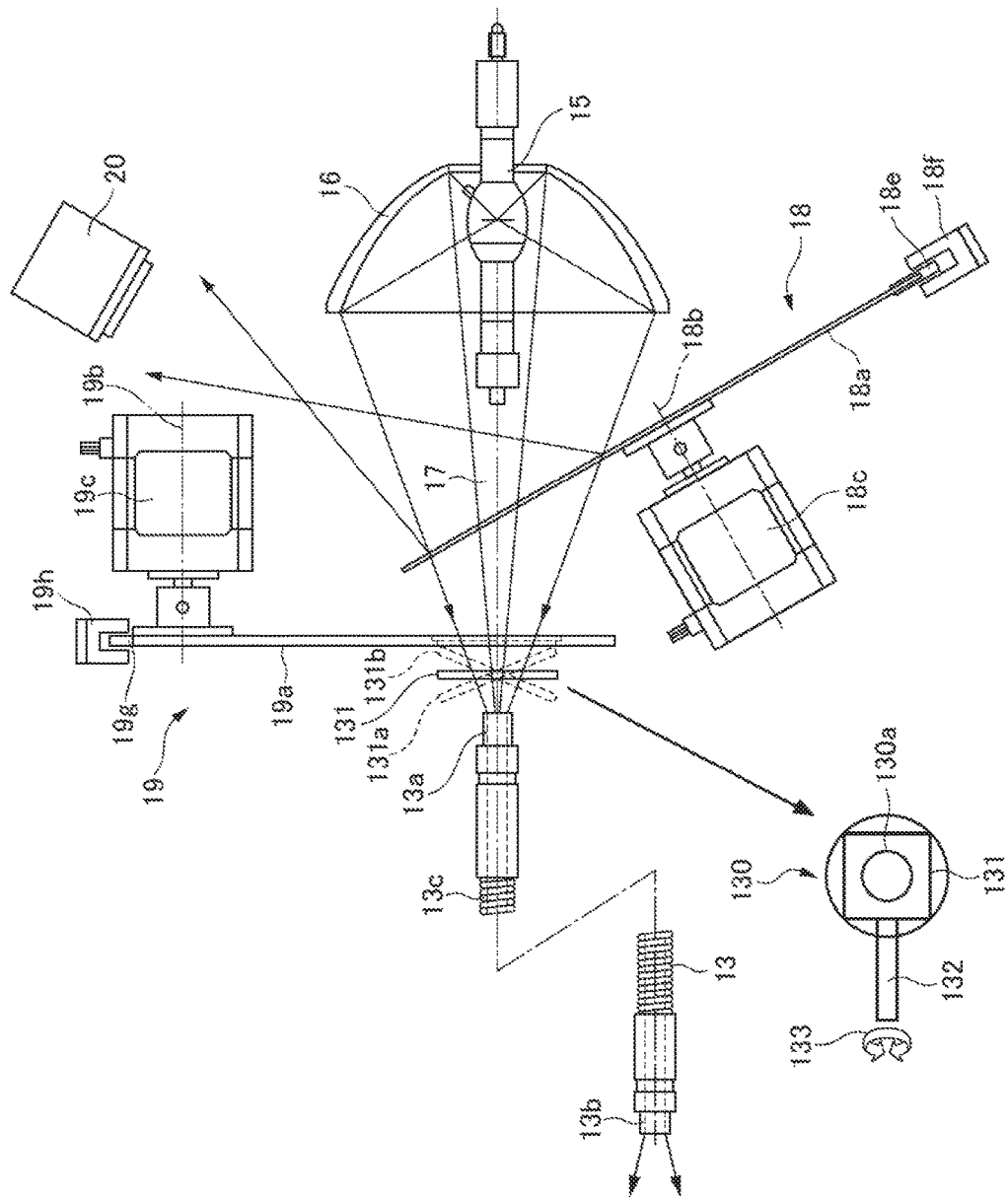
FIG. 13 is a plane view schematically illustrating optical configuration of a light source apparatus for resin curing in a further embodiment according to the present invention.

FIG. 13 schematically illustrates optical configuration of a light source apparatus for resin curing in a further embodiment according to the present invention.

The light source apparatus for resin curing in this embodiment is configured to optically include a light source 15, a collecting reflection mirror 16 to which the light source 15 is mounted, a light-intensity adjustment mechanism 18 of rotation type inserted in a light path 17 for light reflected by the reflection mirror 16, a shutter mechanism 19 inserted in the light path 17 downstream of the light-intensity adjustment mechanism 18, a light intensity sensor 20 for detecting intensity of light emitted from the light source 15, an optical fiber bundle 13 that leads the light spot to the object to be irradiated, and an energy adjustment optical element 130 inserted in the light path 17 downstream of the shutter mechanism 19 in this embodiment. In a modification of this embodiment, the light source 15 and the reflection mirror 16 may be united to form an integrated light source unit.

Because the configurations, functions and advantages of the light source 15, the reflection mirror 16, the light-intensity adjustment mechanism 18, the shutter mechanism 19, the light intensity sensor 20 and the optical fiber bundle 13 are the same as these of the embodiment of FIG. 1 to FIG. 10, explanations are omitted.

The energy adjustment optical element 130 is configured to insert a transmission filter 131 that is a multilayer film type interference filter into a light focusing region 130*a* of the light path 17 so that the surface of this transmission filter 131 is in a state perpendicular to the optical axis (incident angle is 0 degree), or that the surface of this transmission filter 131 is in a state between a state 131*a* inclined by an angle of +20 degrees with respect to the optical axis (incident angle is +20 degree) and a state 131*b* inclined by an angle of −20 degrees with respect to the optical axis (incident angle is −20 degree). That is, as shown by an arrow 133 in FIG. 13, the energy adjustment optical element 130 can incline the surface of the transmission filter 131 by an optional angle between 0 degree and ±20 degrees with respect to the optical axis by rotating an axis 132 of the transmission filter 131 by using such as a stepping motor (not shown) for example. In modifications, the energy adjustment optical element 130 may be configured to incline the surface of the transmission filter 131 by an optional angle between 0 degree and ±45 degrees (an optional angle from 0 degree to an angle less than ±45 degrees) with respect to the optical axis.

This multilayer film type interference transmission filter 131 has a light transmission rate characteristics to partially attenuate only ray in the wavelength range around 365 nm that is the UV curing dominant wavelength of the UV-C ultraviolet ray, and is capable of changing the attenuating wavelength range of the incident ray depending on the incident angle of the ray. For example, the peak wavelength for lowering the light transmission rate will move by approximately 10 nm when the incident angle is changed from 0 degree to ±20 degrees. Therefore, if this transmission filter 131 is inserted in the light path 17 and the angle of its surface with respect to the optical axis is changed, the transmission energy of the UV-C ultraviolet ray around 365 nm can be appropriately attenuated.

Figure 14:
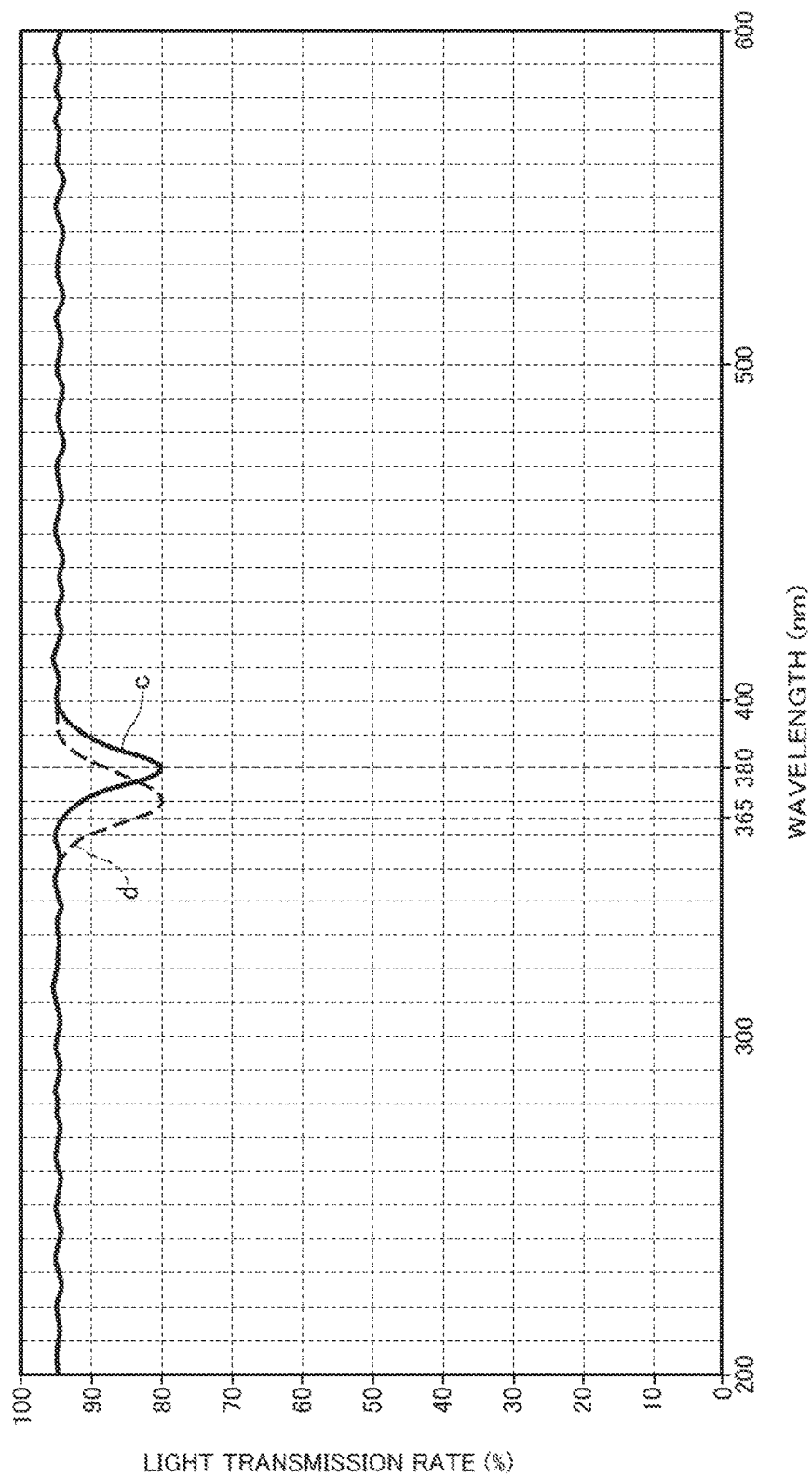
FIG. 14 is a graph illustrating characteristics of light transmission rate with respect to wavelength of an energy adjustment optical element in the embodiment of FIG. 13.

FIG. 14 shows characteristics of light transmission rate of Super UV Filter 365 (SUF-365) that is an example of the multilayer film type interference transmission filter 131. In the figure, "c" indicates characteristics with an incident angle of 0 degree (when the filter surface is perpendicular to the optical axis), "d" indicates characteristics with an incident angle of ±20 degrees (when the filter surface is inclined by ±20 degrees with respect to the optical axis). As will be noted from the figure, in case of the incident angle of 0 degree, the light transmission rate is 95% in the wavelength range from 200 nm to 2500 nm and the light transmission rate is 80% (this transmission rate may be optionally determined) at the wavelength of 380 nm, but a ratio of the light intensity at the wavelength near 250 nm and the light intensity at the wavelength near 365 nm are the same. When the transmission filter 131 is rotated to change the incident angle under the conditions where the ratio of the light intensities is unchanged, the spectrum characteristic of the filter will be shifted with keeping the same characteristic in the ultraviolet ray region and thus the transmission rate at the wavelength of 365 nm can be changed to perform fine adjustment of the transmission rate. It should be noted that the light transmission rate in the wavelength range from 200 nm to 2500 nm is adjustable by changing the electrical current fed to the light source, and that the light transmission rate at the wavelength of 330 nm is optionally selectable by changing material properties (resin properties) of the transmission filter 131.

As aforementioned, in order to effectively remove the tackiness on the resin surface, it is of value to irradiate simultaneously the ultraviolet ray near the wavelength of 365 nm that is the dominant wavelength for UV curing (UV curing dominant wavelength), the ultraviolet ray near the wavelength of 254 nm (tackiness removal wavelength) and the infrared ray. However, because there may be various chemical agents having different wavelength sensitivity properties, it is desired that a ratio of relative intensities between the ray in the UV curing dominant wavelength and the ray in the tackiness removal wavelength can be adjusted freely. According to this embodiment, therefore, the light transmission rate around the UV curing dominant wavelength of 365 nm is adjusted without changing the transmission rate around the tackiness removal wavelength of 254 nm by changing the angle (incident angle) of the filter surface with respect to the optical axis with an optional angle between 0 degree and 20 degrees (an optional angle from 0 degree to an angle less than ±45 degrees) so as to freely control an energy ratio near the UV curing dominant wavelength and near the tackiness removal wavelength at the incidence section 13a of the optical fiber bundle 13.

Another operations and advantages of this embodiment are similar to these of the embodiment shown in FIG. 1 to FIG. 10.

As for the low band reject filter of the low band reject filter mechanism in the embodiments of FIG. 11 and FIG. 12, a transmission filter that is a multilayer film type interference filter in the embodiment of FIG. 13 and FIG. 14 may be used to attenuate the transmission energy of the UV-C ultraviolet ray near the wavelength of 254 nm by changing its incident angle.

EXAMPLE

Hereinafter, a first example of the present invention and first and second comparative examples will be described.

Figure 15:
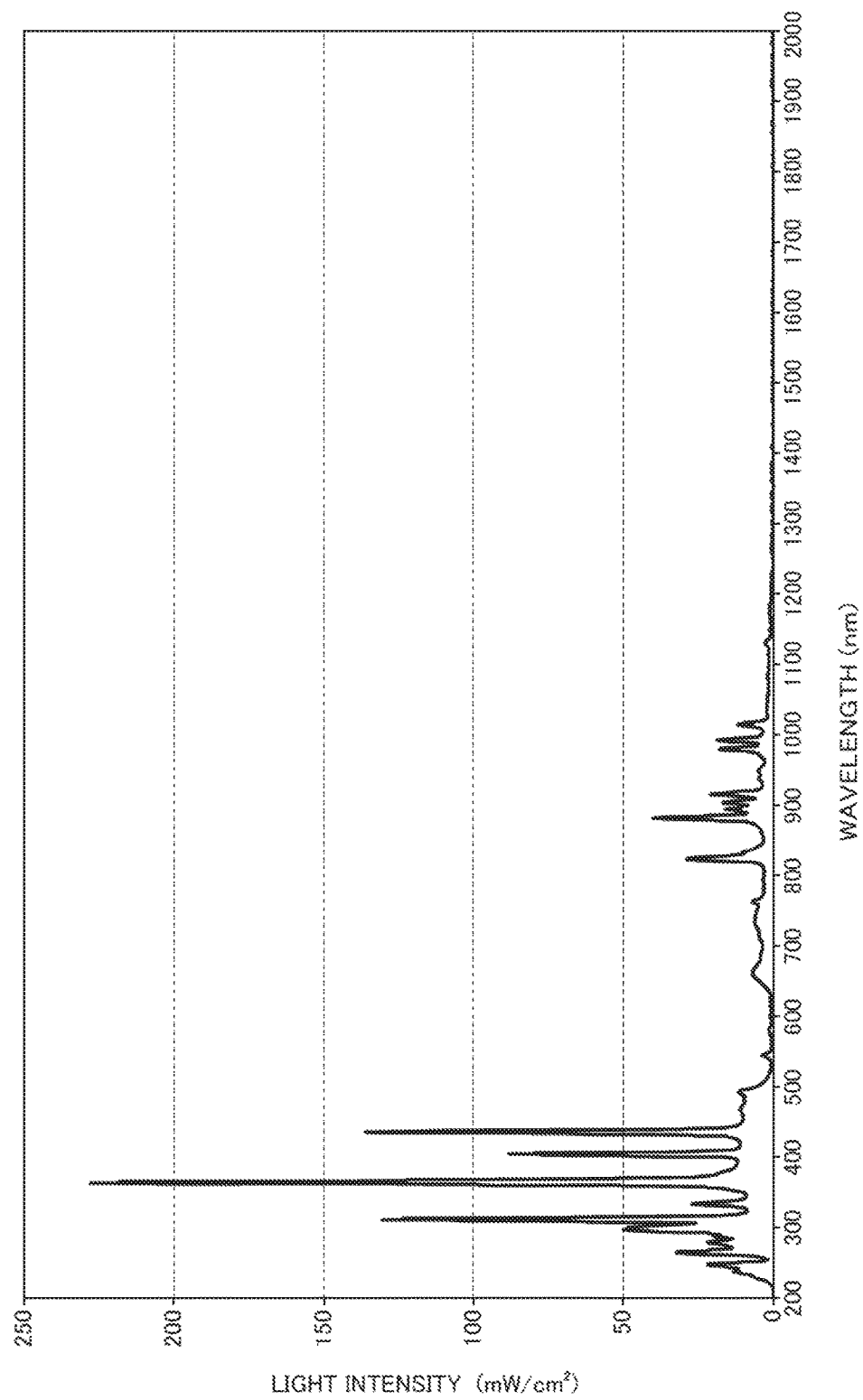
FIG. 15 is a graph illustrating spectral distribution characteristics of really transmitted light in the first example.

As for the first example, ray from a light source was reflected at a reflection mirror (elliptic mirror) with an aluminum vapor-deposited reflection surface, and the reflected ray was irradiated to a UV curing resin through a UV and IR bandpass filter. The UV and IR bandpass filter used was a transmission filter for transmitting UV-C ultraviolet ray in the wavelength region of 250 nm, UV-B ultraviolet ray in the wavelength region of 315 nm, UV-A ultraviolet ray in the wavelength region of 365 nm, and ray in the wavelength region from 640 nm to 2500 nm, and had a light transmission characteristics shown in FIG. 5. FIG. 15 shows spectral distribution characteristics of ray transmitted through this transmission filter.

By irradiating such ray to the UV curing resin for ten seconds, when the surface of the resin was touched by hand after the irradiation, it was revealed that the UV curing resin had been hardened and the tackiness on the surface had been completely removed. In addition, any destruction, any deformation, any damage and/or any burn of the UV curing resin due to too strong irradiation energy had not occurred at all.

Figure 16:
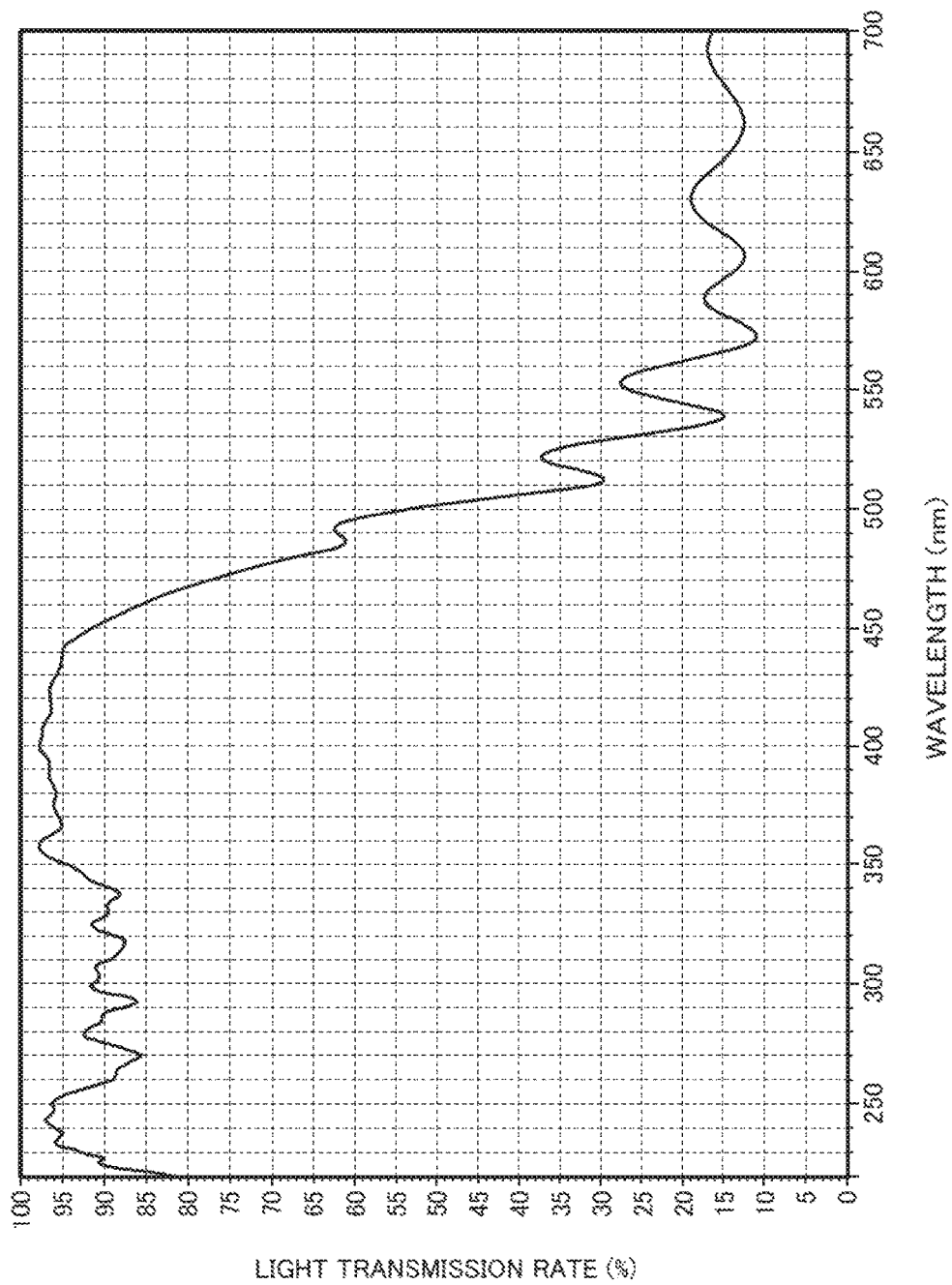
FIG. 16 is a graph illustrating characteristics of light transmission rate with respect to wavelength of a band pass filter in a first comparison example.
Figure 17:
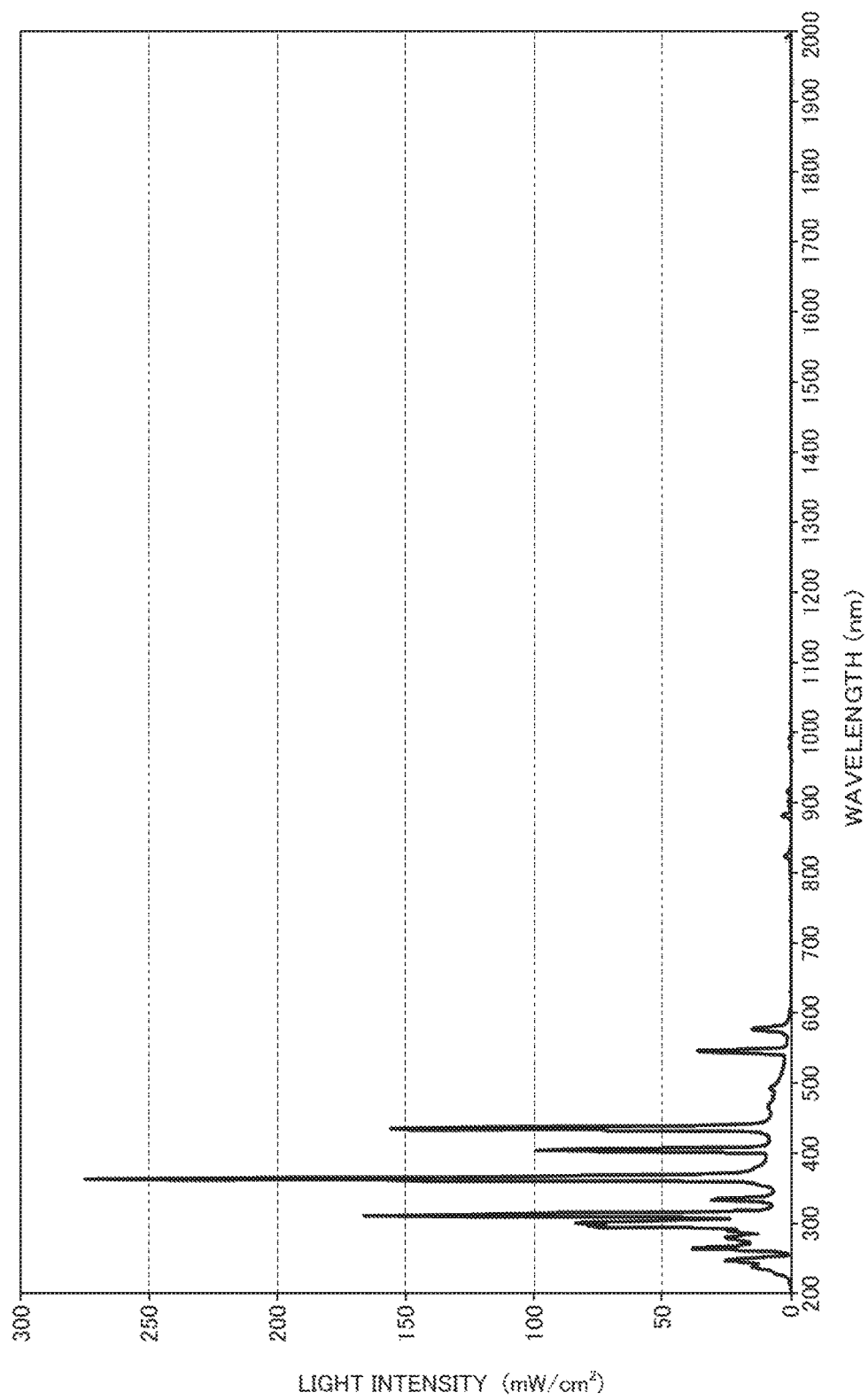
FIG. 17 is a graph illustrating spectral distribution characteristics of really transmitted light in the first comparison example.

As for the first comparative example, ray from a light source was reflected at a reflection mirror (elliptic mirror) with an aluminum vapor-deposited reflection surface, and the reflected ray was irradiated to a UV curing resin through a UV bandpass filter. The UV bandpass filter used was a transmission filter for transmitting UV-C ultraviolet ray, UV-B ultraviolet ray and UV-A ultraviolet ray in the wavelength region from 200 nm to 400 nm containing the wavelength region of 250 nm and ray in a part of visible light but for not transmitting infrared ray at all, and had a light transmission characteristics shown in FIG. 16. FIG. 17 shows spectral distribution characteristics of ray transmitted through this transmission filter.

By irradiating such ray to the UV curing resin for ten seconds, when the surface of the resin was touched by hand after the irradiation, it was revealed that the tackiness on the surface of the UV curing resin had been remained and not been removed.

Figure 18:
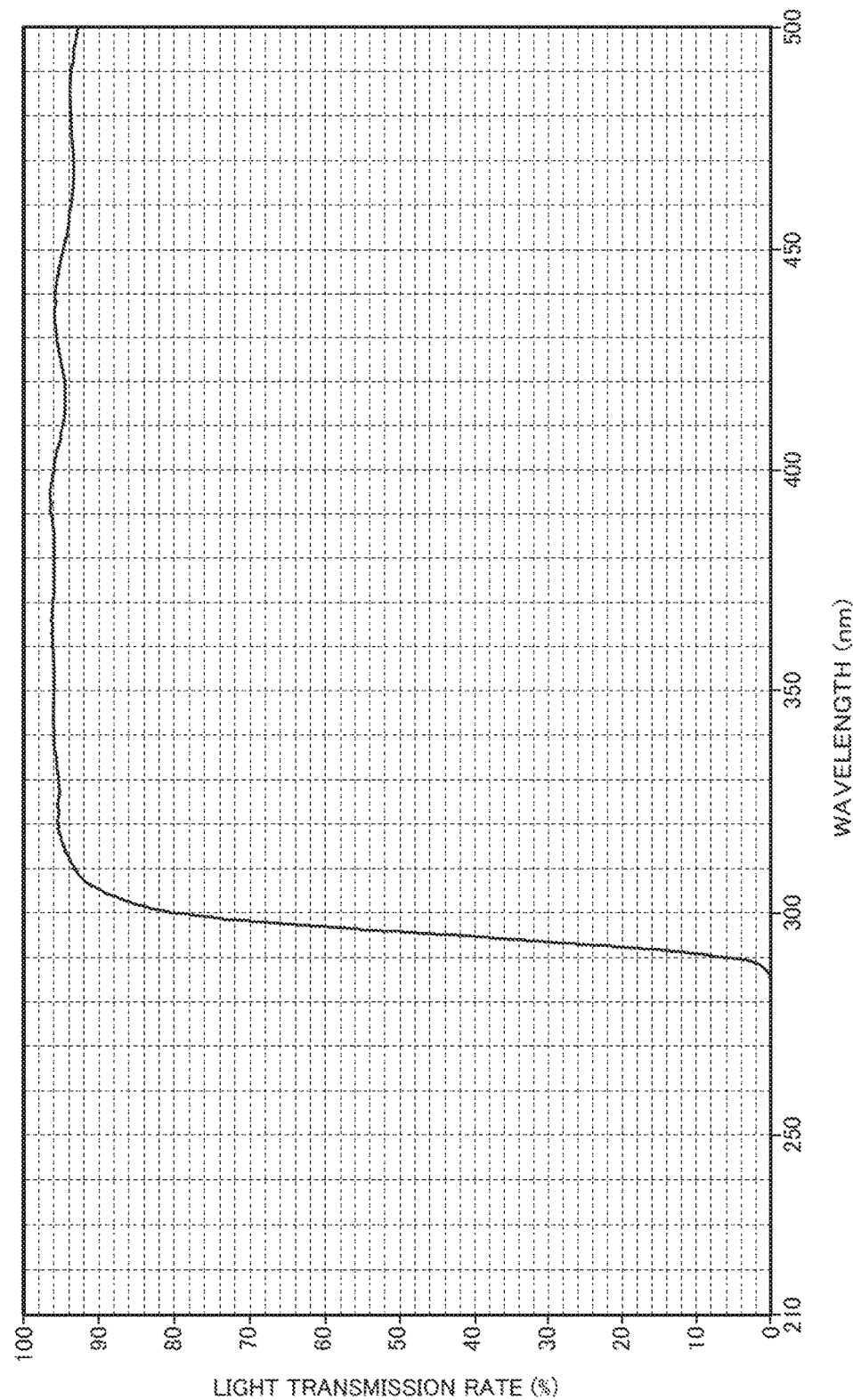
FIG. 18 is a graph illustrating characteristics of light transmission rate with respect to wavelength of a band pass filter in a second comparison example.
Figure 19:
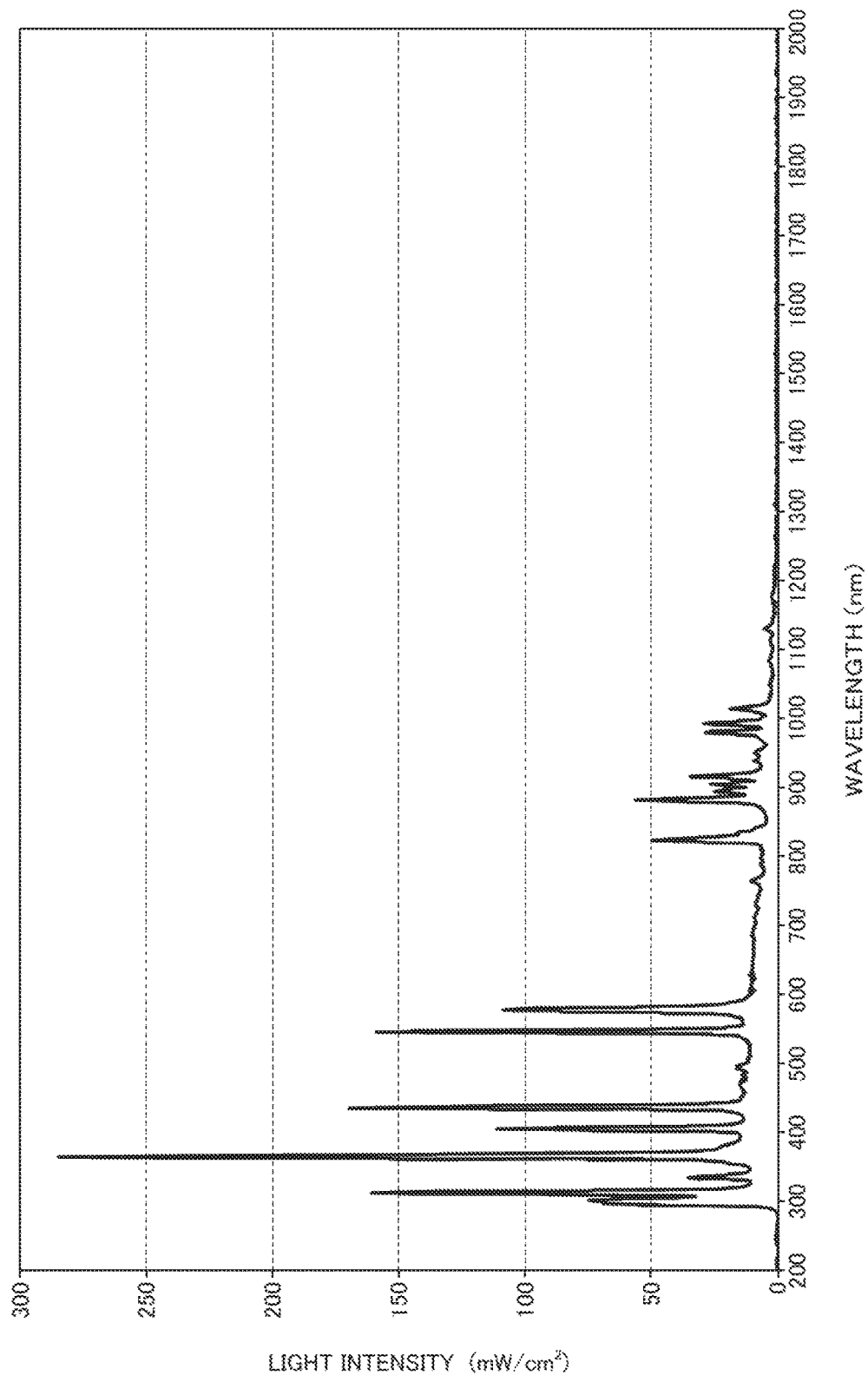
FIG. 19 is a graph illustrating spectral distribution characteristics of really transmitted light in the second comparison example.

As for the second comparative example, ray from a light source was reflected at a reflection mirror (elliptic mirror) with an aluminum vapor-deposited reflection surface, and the reflected ray was irradiated to a UV curing resin through a UV and IR bandpass filter. The UV and IR bandpass filter used was a transmission filter for transmitting UV-B ultraviolet ray and UV-A ultraviolet ray in the wavelength region equal to or more than 300 nm and infrared ray but for not transmitting ultraviolet ray in the wavelength region less than 300 nm particularly the ultraviolet ray in the wavelength region of 250 nm at all, and had a light transmission characteristics shown in FIG. 18. FIG. 19 shows spectral distribution characteristics of ray transmitted through this transmission filter.

By irradiating such ray to the UV curing resin for ten seconds, when the surface of the resin was touched by hand after the irradiation, it was revealed that the tackiness on the surface of the UV curing resin had been remained and not been removed.

It is understood from the aforementioned fist example, and first and second comparative examples that the tackiness on the resin surface can be completely removed by irradiating the ray of the first example for a short time (around ten seconds), and that any destruction, any deformation, any damage and/or any burn of the UV curing resin due to too strong irradiation energy is not occurred at all. Also, it is understood that the tackiness on the resin surface can be somewhat removed by irradiating the ray in the all wavelength range, but that destruction, deformation. damage and/or burn of the UV curing resin may be occurred in this case due to too strong irradiation energy.

Many widely different embodiments of the present invention may be constructed without departing from the spirit and scope of the present invention. It should be understood that the present invention is not limited to the specific embodiments described in the specification, except as defined in the appended claims.

INDUSTRIAL APPLICABILITY

The present invention is applicable to an adhesive coating device and an adhesive curing device, or a resin curing device for hardening a light curing resin of a resin adhesive.

DENOTATION OF REFERENCE NUMERALS

10: light source apparatus for resin curing
11: housings
11a front surface
12: control panels
13: optical fiber bundle
13a: incidence section
13b: emission section
13c: coating layer
14: attachment
15: light source
16: reflection mirror
17: light path
18: light-intensity adjustment mechanism
18a: rotation-type adjustment board
18a': linear movement-type adjustment board
18b, 19b: rotation axis
18c, 19c: stepping motor
18d, 18d': opening portion
18e, 19g: projection for origin confirmation
18f, 19h: photo-interrupter
19, 19': shutter mechanism
19a: rotation-type shutter board
19a': linear movement-type shutter board
19d, 19d': IR bandpass filter
19e, 19e': light interception portion
19f, 19f': UV bandpass filter
19i, 19i': UV and IR bandpass filter
20: light intensity sensor
21a, 21b, 21c, 21d, 21a', 21b', 21c', 21d': light spot
60: lamp power supply
61: lamp power supply control board
62: PLC
63: calibration light intensity detector
64: thermometer
65: interlock switch
66: thermostat
67: start switch
68, 69, 71: Ethernet®
70: hub
72: external computer
80: main button
81: recipe button
82: calibration button
83: setup button
84: light intensity and monitor voltage display region
85: countdown monitor region
85a: count-start button
85b: count-stop button
86a: ON button
86b: OFF button
87a: IR bandpass filter button
87b: light interrupting button
87c: UV bandpass filter button
88: light intensity adjustment region
88a: up button
88b: down button
90: recipe selection area
90a: recipe number portion
90b: memo button
91: shutter control region
91a: UV-IR button
91b: IR-UV button
91c: UV and IR button
92: region for displaying irradiation time and light intensity
93: region for displaying light interception time
100a: UV button
100b: IR button
101: reference value region
102: calibration start region
102a: start button
102b: situation display region
110: low frequency cutoff filter mechanism
110a, 130a: light focus region
111: low frequency cutoff filter
130: energy adjustment optical element
131: transmission filter
132: optical axis

What is claimed is:

1. A light source apparatus for resin curing comprising a light source, an optical system for guiding a light emitted from said light source to an emission section, and a light transmission section, selectively insertable in a light path in said optical system, for passing there through a UV-C ultraviolet ray containing a ray in the wavelength range of 250 nm, a visible light except for light in the wavelength range from 500 nm to 640 nm and an infrared ray together so as to remove a tackiness on a resin surface.

2. The light source apparatus for resin curing as claimed in claim 1, wherein said light transmission section is configured to further pass a UV-B ultraviolet ray and a UV-A ultraviolet ray.

3. The light source apparatus for resin curing as claimed in claim 1, wherein said light transmission section comprises a transmission filter or a transmission mirror for passing an ultraviolet ray with said wavelength range, a visible light with said wavelength range and an infrared ray.

4. The light source apparatus for resin curing as claimed in claim 1, wherein said apparatus is configured that a low band-reject filter, provided with light transmission characteristics capable of attenuating a part of the wavelength of a UV-C ultraviolet ray, is selectively insertable in a part of or entire of a light focusing region of said light path.

5. The light source apparatus for resin curing as claimed in claim 1, wherein said apparatus is configured that an energy adjustment optical element for adjusting energy of ray in the wavelength range around 365 nm that is a UV curing dominant wavelength of a UV-C ultraviolet ray is insertable in a light focusing region of said light path.

6. The light source apparatus for resin curing as claimed in claim 5, wherein said energy adjustment optical element is configured to adjust transmission energy of ray in the wavelength range around 365 nm by changing an incident angle of a multilayer film type interference filter.

7. The light source apparatus for resin curing as claimed in claim 1, wherein said apparatus further comprises a shutter mechanism inserted in said light path of said optical system for opening and closing said light path so as to control an exposure time of an object to be irradiated, and wherein said shutter mechanism is configured so that said light transmission section can be selectively inserted in said light path.

8. The light source apparatus for resin curing as claimed in claim 1, wherein said light source includes a metal halide lamp, mercury-xenon lamp or a plurality of LED elements.

9. The light source apparatus for resin curing as claimed in claim 1, wherein said optical system comprises an ellipse mirror for reflecting and focusing a ray in all wavelength bands emitted from said light source, or a lens for focusing a ray in all wavelength bands emitted from said light source.

* * * * *